US008359196B2

(12) United States Patent
Yoshida

(10) Patent No.: US 8,359,196 B2
(45) Date of Patent: Jan. 22, 2013

(54) STEREO SOUND DECODING APPARATUS, STEREO SOUND ENCODING APPARATUS AND LOST-FRAME COMPENSATING METHOD

(75) Inventor: Koji Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 12/810,332

(22) PCT Filed: Dec. 26, 2008

(86) PCT No.: PCT/JP2008/004005

§ 371 (c)(1),
(2), (4) Date: Jun. 24, 2010

(87) PCT Pub. No.: WO2009/084226

PCT Pub. Date: Jul. 9, 2009

(65) Prior Publication Data

US 2010/0280822 A1 Nov. 4, 2010

(30) Foreign Application Priority Data

Dec. 28, 2007 (JP) ................................ 2007-339852
May 30, 2008 (JP) ................................ 2008-143936

(51) Int. Cl.
*G10L 19/00* (2006.01)
*G06F 11/00* (2006.01)

(52) U.S. Cl. ......... 704/216; 704/500; 714/746; 714/747

(58) Field of Classification Search .................. 704/216, 704/218, 500; 381/22; 714/746, 747
See application file for complete search history.

(56) References Cited

U.S. PATENT DOCUMENTS 5,974,380 A * 10/1999 Smyth et al. ................. 704/229
(Continued)

FOREIGN PATENT DOCUMENTS

JP 2001-501063 1/2001
(Continued)

OTHER PUBLICATIONS

3GPP TS 26.290 V7.0.0, Technical Specification, 3rd Generation Partnership Project; Technical Specification Group Service Aspects; Audio codec processing functions; Extended Adaptive Multi-Rate—Wideband (AMR-WB+) codec; Transcoding functions (Release 7) Mar. 2007.

*Primary Examiner* — James Wozniak
(74) *Attorney, Agent, or Firm* — Greenblum & Bernstein, P.L.C.

(57) ABSTRACT

A stereo sound decoding apparatus wherein lost-frame compensation performance has been improved to enhance the quality of decoded sounds. In this stereo sound decoding apparatus, a sound decoding part uses encoded monophonic signal data and encoded side signal data, which are received from a sound encoding apparatus, to generate monophonic decoded signals and stereo decoded signals; a compensation signal switching determining part that compares an inter-channel correlation and an intra-channel correlation, which have been calculated by use of the monophonic decoded signals of a previous frame and the stereo decoded signals of the previous frame, with respective comparison thresholds; a compensation signal switching part that selects, based on a result of the comparison in the compensation signal switching determining part, as compensation signals either inter-channel compensation signals generated by an inter-channel compensating part or intra-channel compensation signals generated by an intra-channel compensating part; and an output signal switching part that outputs either the stereo decoded signals or the compensation signals according to whether the encoded side signal data of the current frame has been lost.

5 Claims, 13 Drawing Sheets

U.S. PATENT DOCUMENTS

| | | | | |
|---|---|---|---|---|
| 2001/0050926 | A1* | 12/2001 | Kumar | 370/529 |
| 2002/0147590 | A1 | 10/2002 | Sydanmaa et al. | |
| 2004/0008615 | A1 | 1/2004 | Oh | |
| 2004/0039464 | A1* | 2/2004 | Virolainen et al. | 700/94 |
| 2004/0107090 | A1 | 6/2004 | Oh et al. | |
| 2005/0182996 | A1 | 8/2005 | Bruhn | |
| 2008/0065372 | A1* | 3/2008 | Yoshida | 704/202 |
| 2008/0071548 | A1 | 3/2008 | Moriya et al. | |
| 2009/0083041 | A1* | 3/2009 | Yoshida | 704/500 |
| 2009/0119111 | A1 | 5/2009 | Goto et al. | |
| 2009/0150162 | A1 | 6/2009 | Goto et al. | |
| 2009/0262945 | A1 | 10/2009 | Teo et al. | |
| 2009/0276210 | A1 | 11/2009 | Goto et al. | |
| 2009/0278995 | A1* | 11/2009 | Oh | 348/731 |
| 2010/0010811 | A1 | 1/2010 | Zhou et al. | |
| 2010/0250244 | A1* | 9/2010 | Zhong et al. | 704/203 |

FOREIGN PATENT DOCUMENTS

| | | |
|---|---|---|
| JP | 2004-46179 | 2/2004 |
| JP | 2004-184975 | 7/2004 |
| JP | 2007-529020 | 10/2007 |
| WO | 2005/119950 | 12/2005 |
| WO | 2006/003993 | 1/2006 |

* cited by examiner

STEREO SOUND DECODING APPARATUS, STEREO SOUND ENCODING APPARATUS AND LOST-FRAME COMPENSATING METHOD

TECHNICAL FIELD

The present invention relates to a stereo speech decoding apparatus, stereo speech encoding apparatus and lost frame concealment method for performing lost frame concealment of high quality when a packet loss (i.e. frame loss) occurs upon transmitting encoded data, in stereo speech coding with a monaural-stereo scalable configuration.

BACKGROUND ART

With diversification of services and broadbandization of transmission bands in mobile communication and IP (Internet Protocol) communication, there is an increasing demand for high sound quality and high fidelity in speech communication. For example, from now on, it is expected that there is an increasing demand for hand-free speech communication in video telephone services, speech communication in a videoconference, multi-point speech communication whereby a plurality of callers conduct conversation simultaneously in many locations, and speech communication capable of transmitting ambient environment sound with maintaining fidelity. In this case, it is desired to realize speech communication by stereo speech, which has higher fidelity than monaural signals and which is capable of recognizing positions at which a plurality of callers talk. To realize such speech communication by stereo speech, stereo speech coding is essential.

Also, in speech data communication on an IP network, speech coding with a scalable configuration is desired to realize traffic control on the network and multicast communication. Here, the scalable configuration refers to a configuration in which speech data can be decoded even from fragmentary encoded data on the receiving side.

Therefore, even when encoding and transmitting stereo speech, coding with a scalable configuration between monaural speech and stereo speech (i.e. monaural-stereo scalable configuration) is desired where the receiving side can select between decoding a stereo signal and decoding a monaural signal using part of encoded data.

In such scalable coding, stereo signals are often converted to a sum signal (i.e. monaural signal) and difference signal (i.e. side signal) and encoded. Non-Patent Document 1 discloses a technique of lost frame concealment in a case where a side signal frame is lost. According to the technique disclosed in Non-Patent Document 1, a side signal is divided into the low-band part, middle-band part and high-band part and encoded. As for the low-band part, a side signal lost frame is concealed by interpolating a spectrum using a past decoded side signal. Also, as for the middle-band part, a lost frame is concealed by performing decoding using attenuated values of coding parameters (such as filter parameters and channel gains) of a past side signal. Also, as for the low-band part, when the frame loss rate increases, the side signal of a frame to be concealed is attenuated more strongly.

Non-Patent Document 1: 3GPP TS26.290 V7.0.0, 2007, Chapter 6.5.2

DISCLOSURE OF INVENTION

Problems to be Solved by the Invention

However, according to the technique disclosed in above Non-Patent Document 1, although concealment performance is sufficient when the inter-channel correlation of a stereo signal is high, the concealment performance degrades when the inter-channel correlation of the stereo signal is low. For example, upon performing scalable coding of stereo speech comprised of speech of two speakers using two respective microphones, the inter-channel correlation becomes low and the amount of encoded information in a stereo enhancement section increases. Therefore, by concealing a lost frame only by interpolation from coding parameters of a side signal or past side signal decoded on the decoding side, the quality of the side signal acquired in the concealed frame degrades.

It is therefore an object of the present invention to provide a stereo speech decoding apparatus, stereo speech encoding apparatus and lost frame concealment method for improving lost frame concealment performance and improving the quality of decoded speech even when the inter-channel correlation of a stereo signal is low.

Means for Solving the Problem

The stereo speech decoding apparatus of the present invention employs a configuration having: a monaural decoding section that decodes monaural encoded data to generate a monaural decoded signal, the monaural encoded data encoding in a speech encoding apparatus a monaural signal acquired using an addition of a first channel signal and second channel signal; a stereo decoding section that decodes side signal encoded data to generate a side decoded signal, and generates a stereo decoded signal comprised of a first channel decoded signal and second channel decoded signal using the monaural decoded signal and the side decoded signal, the side signal encoded data encoding in the speech encoding apparatus a side signal acquired using a difference between the first channel signal and the second channel signal; a comparison section that compares a comparison threshold with an inter-channel correlation and intra-channel correlation calculated using the monaural decoded signal of a past frame and the stereo decoded signal of the past frame; an inter-channel concealment section that performs an inter-channel concealment using the monaural decoded signal of a current frame and the stereo decoded signal of the past frame, and generates an inter-channel concealed signal; an intra-channel concealment section that performs an intra-channel concealment using the monaural decoded signal of the current frame and the stereo signal of the past frame, and generates an intra-channel concealed signal; a concealed signal selecting section that selects one of the inter-channel concealed signal and the intra-channel concealed signal, as a concealed signal, based on a comparison result in the comparison section; and an output signal switching section that outputs the stereo decoded signal when the side signal encoded data of the current frame is not lost, or outputs the concealed signal when the side signal encoded data of the current frame is lost.

The stereo speech encoding apparatus of the present invention employs a configuration having: a monaural signal encoding section that encodes a monaural signal acquired using an addition of a first channel signal and second channel signal; a side signal encoding section that encodes a side signal acquired using a difference between the first channel signal and the second channel signal; and a deciding section that compares a threshold with an inter-channel correlation and intra-channel correlation calculated using the monaural signal of a past frame and the stereo signal of the past frame, and, based on a comparison result, decides which of an inter-channel concealment and intra-channel concealment is used in a speech decoding apparatus to conceal a lost frame.

The lost frame concealment method of the present invention includes the steps of: decoding monaural encoded data to generate a monaural decoded signal, the monaural encoded data encoding in a speech encoding apparatus a monaural signal acquired using an addition of a first channel signal and second channel signal; decoding side signal encoded data to generate a side decoded signal, and generating a stereo decoded signal comprised of a first channel decoded signal and second channel decoded signal using the monaural decoded signal and the side decoded signal, the side signal encoded data encoding in the speech encoding apparatus a side signal acquired using a difference between the first channel signal and the second channel signal; comparing a comparison threshold with an inter-channel correlation and intra-channel correlation calculated using the monaural decoded signal of a past frame and the stereo decoded signal of the past frame; performing an inter-channel concealment using the monaural decoded signal of a current frame and the stereo decoded signal of the past frame, and generating an inter-channel concealed signal; performing an intra-channel concealment using the monaural decoded signal of the current frame and the stereo signal of the past frame, and generating an intra-channel concealed signal; selecting one of the inter-channel concealed signal and the intra-channel concealed signal, as a concealed signal, based on a comparison result in the comparison step; and outputting the stereo decoded signal when the side signal encoded data of the current frame is not lost, or outputting the concealed signal when the side signal encoded data of the current frame is lost.

Advantageous Effect of the Invention

According to the present invention, even when the inter-channel correlation of a stereo signal is low, it is possible to improve lost frame concealment performance and improve the quality of decoded speech.

BEST MODE FOR CARRYING OUT THE INVENTION

Embodiments of the present invention will be explained below in detail with reference to the accompanying drawings, using speech coding with a two-layer (i.e. monaural-stereo) scalable configuration as an example.

Embodiment 1

An example case will be explained where a stereo speech signal is comprised of a first channel and second channel, and where operations are performed in frame units. Here, the first channel and the second channel represent, for example, the left (L) channel and the right (R) channel, respectively.

The speech encoding apparatus according to Embodiment 1 of the present invention (not shown) generates monaural signal M(n) and side signal S(n) according to following equations 1 and 2, using the first channel signal and second channel signal of a stereo speech signal. Further, the speech encoding apparatus according to the present embodiment generates monaural signal encoded data and side signal encoded data by encoding monaural signal M(n) and side signal S(n), and outputs the monaural signal encoded data and side signal encoded data to the speech decoding apparatus according to the present embodiment.

(Equation 1)

$$M(n)=\{S\_ch1(n)+S\_ch2(n)\}/2,\ n=0, 1, 2, \ldots, N-1 \quad [1]$$

(Equation 2)

$$S(n)=\{S\_ch1(n)-S\_ch2(n)\}/2,\ n=0, 1, 2, \ldots, N-1 \quad [2]$$

In equations 1 and 2, "n" represents the sample number, and "N" represents the number of samples in one frame. Also, S_ch1(*n*) represents the first channel signal, and S_ch2(*n*) represents the second channel signal.

Figure 1:
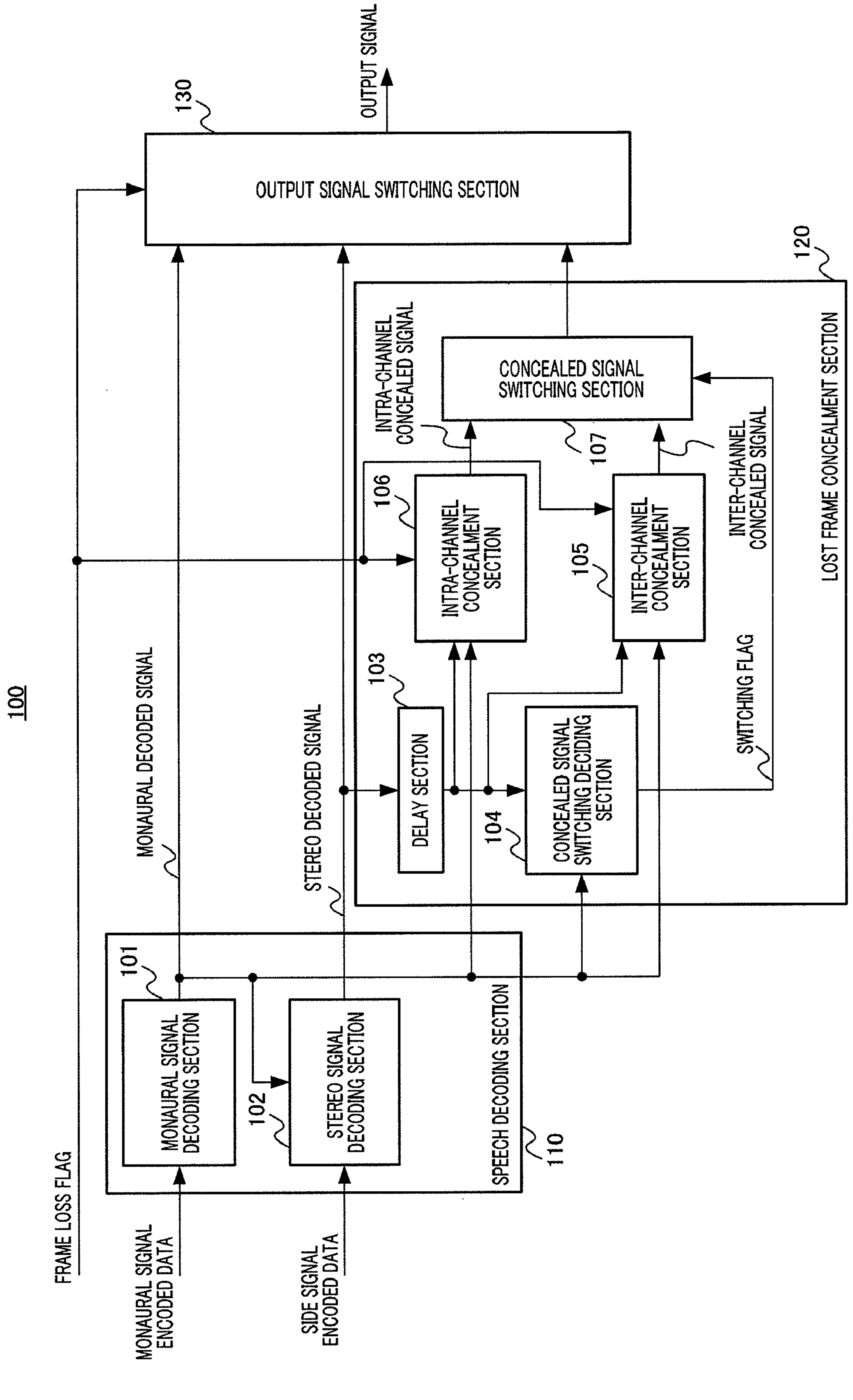
FIG. 1 is a block diagram showing the main components of a speech decoding apparatus according to Embodiment 1 of the present invention.

FIG. 1 is a block diagram showing the main components of speech decoding apparatus 100 according to Embodiment 1 of the present invention. Speech decoding apparatus 100 shown in FIG. 1 is provided with: speech decoding section 110 that decodes monaural signal encoded data and side signal encoded data transmitted from the speech encoding apparatus; lost frame concealment section 120 that performs lost frame concealment of the side signal encoded data; and output signal switching section 130 that switches an output signal of speech decoding apparatus 100 according to whether or not there is a frame loss in the side signal encoded data.

Speech decoding section 110 has a two-layer configuration of a core layer and enhancement layer, where the core layer is comprised of monaural signal decoding section 101 and the enhancement layer is comprised of stereo signal decoding section 102.

Lost frame concealment section 120 is provided with delay section 103, concealed signal switching deciding section 104, inter-channel concealment section 105, intra-channel concealment section 106 and concealed signal switching section 107.

Monaural signal decoding section 101 decodes monaural signal encoded data transmitted from the speech encoding apparatus, and outputs resulting monaural decoded signal Md(n) to stereo signal decoding section 102, concealed signal switching deciding section 104, inter-channel concealment section 105, intra-channel concealment section 106 and output signal switching section 130.

Stereo signal decoding section 102 decodes side signal encoded data transmitted from the speech encoding apparatus and acquires side decoded signal Sd(n). Further, stereo signal decoding section 102 calculates first channel decoded signal Sds_ch1(*n*) and second channel decoded signal Sds_ch2(*n*) according to following equations 3 and 4, using side decoded signal Sd(n) and monaural decoded signal Md(n) received as input from monaural signal decoding section 101. Further, stereo signal decoding section 102 outputs a stereo decoded signal comprised of calculated first channel decoded signal Sds_ch1(*n*) and second channel decoded signal Sds_ch2(*n*), to delay section 103 and output signal switching section 130. Also, in the following, first channel decoded signal Sds_ch1(*n*) and second channel decoded signal Sds_ch2(*n*) will be equally expressed as stereo decoded signals Sds_ch1(*n*) and Sds_ch2(*n*), respectively.

(Equation 3)

$$Sds\_ch1(n)=Md(n)+Sd(n),\ n=0, 1, 2, \ldots, N-1 \quad [3]$$

(Equation 4)

$$Sds\_ch2(n)=Md(n)-Sd(n),\ n=0, 1, 2, \ldots, N-1 \quad [4]$$

Delay section 103 delays stereo decoded signals Sds_ch1(*n*) and Sds_ch2(*n*) received as input from stereo signal decoding section 102 by one frame, and outputs stereo decoded signals Sdp_ch1(*n*) and Sdp_ch2(*n*) of the previous frame to concealed signal switching deciding section 104, inter-channel concealment section 105 and intra-channel interpolation section 106. Also, in the following, stereo decoded signals Sdp_ch1(*n*) and Sdp_ch2(*n*) of the previous frame will be equally expressed as "first channel decoded signal Sdp_ch1(*n*)" (or "ch1 signal") and "second channel decoded signal Sdp_ch2(*n*)" (or "ch2 signal") of the previous frame, respectively.

Concealed signal switching deciding section 104 calculates the inter-channel correlation degree and intra-channel correlation degree, using stereo decoded signals Sdp_ch1(*n*) and Sdp_ch2(*n*) of the previous frame received as input from delay section 103 and monaural decoded signal Md(n) received as input from monaural signal decoding section 101. Further, based on the calculated inter-channel correlation degree and intra-channel correlation degree, concealed signal switching deciding section 104 decides which of an inter-channel concealed signal acquired in inter-channel concealment section 105 and intra-channel concealed signal acquired in intra-channel concealment section 106 is used as a stereo concealment signal, and outputs a switching flag indicating the decision result to concealed signal switching section 107. Also, concealed signal switching deciding section 104 will be described later in detail.

Inter-channel concealment section 105 decides whether or not side signal encoded data of the current frame is lost upon transmitting encoded data, based on a frame loss flag received as input separately from the monaural signal encoded data and side signal encoded data. Here, the frame loss flag is a flag for reporting whether or not there is a frame loss, and is reported from a frame loss detecting section (not shown) placed in the outside of speech decoding apparatus 100.

If inter-channel concealment section 105 decides that the side signal encoded data of the current frame is lost (i.e. there is a frame loss), inter-channel concealment section 105 calculates inter-channel prediction parameters between the monaural decoded signal and the channel signals (i.e. the first channel signal and second channel signal) of the stereo decoded signal, using the monaural decoded signal of the current frame received as input from monaural signal decoding section 101 and the stereo decoded signal of the previous frame received as input from delay section 103, and performs inter-channel concealment using the calculated inter-channel prediction parameters. Further, inter-channel concealment section 105 outputs an inter-channel concealed signal of the current frame acquired by inter-channel concealment, to concealed signal switching section 107. Also, inter-channel concealment section 105 will be described later in detail.

Intra-channel concealment section 106 decides whether or not the side signal encoded data of the current frame is lost upon transmitting encoded data, based on the frame loss flag received as input from outside speech decoding apparatus 100. If intra-channel concealment section 106 decides that the side signal encoded data of the current frame is lost, intra-channel concealment section 106 generates first intra-channel concealed signal Sd_ch1(*n*) and second intra-channel concealed signal Sd_ch2(*n*) of the current frame by performing intra-channel concealment by waveform interpolation, using first channel decoded signal Sdp_ch1(*n*) and second channel decoded signal Sdp_ch2(*n*) of the previous frame and monaural decoded signal Md(n) received as input from monaural signal decoding section 101. Further, intra-channel concealment section 106 outputs, to concealed signal switching section 107, an intra-channel concealed signal comprised of first intra-channel concealed signal Sd_ch1(*n*) and second intra-channel concealed signal Sd_ch2(*n*) of the current frame generated by intra-channel concealment. Here, intra-channel concealment section 106 may not receive as input monaural decoded signal Md(n) from monaural signal decoding section 101, and will be described later in detail.

Concealed signal switching section 107 outputs one of the inter-channel concealed signal acquired in inter-channel concealment section 105 and the intra-channel concealed signal acquired in intra-channel concealment section 106 to output signal switching section 130, as stereo concealed signals Sr_ch1(*n*) and Sr_ch2(*n*), based on the switching flag received as input from concealed signal switching deciding section 104.

If speech decoding apparatus 100 only decodes a monaural signal, output signal switching section 130 outputs monaural decoded signal Md(n) received as input from monaural signal decoding section 101, as an output signal, regardless of the value of a frame loss flag.

By contrast, if speech decoding apparatus 100 decodes a stereo signal and receives as input a frame loss flag indicating a frame loss, output signal switching section 130 outputs stereo concealed signals Sr_ch1(*n*) and Sr_ch(n) received as input from lost frame concealment section 120 as is, as output signals.

Also, if speech decoding apparatus 100 decodes a stereo signal and receives as input a frame loss flag indicating no frame loss (i.e. normal reception), output signal switching section 130 performs different processing depending on whether or not there is a frame loss in the previous frame. To be more specific, if side signal encoded data of the previous frame is also received normally without loss, output signal switching section 130 outputs stereo decoded signals Sds_ch1($n$) and Sds_ch2($n$) received as input from stereo signal decoding section 102 as is, as output signals. By contrast, if the side signal decoded data of the previous frame is lost, overlap-and-add processing is performed to resolve the discontinuity between frames. As an example of overlap-and-add processing, Sout_ch1($n$) and Sout_ch2($n$) forming output signals are calculated according to, for example, following equations 5 and 6. To be more specific, upon lost frame concealment in the previous frame, output signals Sout_ch1($n$) and Sout_ch2($n$) are produced by generating in advance stereo concealed signals Sr_ch1($n$) (n=0, 1, . . . , L−1) and Sr_ch2($n$) (n=0, 1, . . . , L−1) adding overlap period length L to frame length N and by overlapping these stereo concealed signals over the period which is L sample length from the head of the current frame.

(Equation 5)

$$\mathrm{Sout\_ch1}(n) = \begin{cases} (n/L)\cdot \mathrm{Sds\_ch1}(n) + & n = 0, \ldots, L-1 \\ (1 - n/L)\cdot \mathrm{Sr\_ch1}(n), & \\ \mathrm{Sds\_ch1}(n), & n = L, \ldots, N-1 \end{cases} \quad [5]$$

(Equation 6)

$$\mathrm{Sout\_ch2}(n) = \begin{cases} (n/L)\cdot \mathrm{Sds\_ch2}(n) + & n = 0, \ldots, L-1 \\ (1 - n/L)\cdot \mathrm{Sr\_ch2}(n), & \\ \mathrm{Sds\_ch2}(n), & n = L, \ldots, N-1 \end{cases} \quad [6]$$

Figure 2:
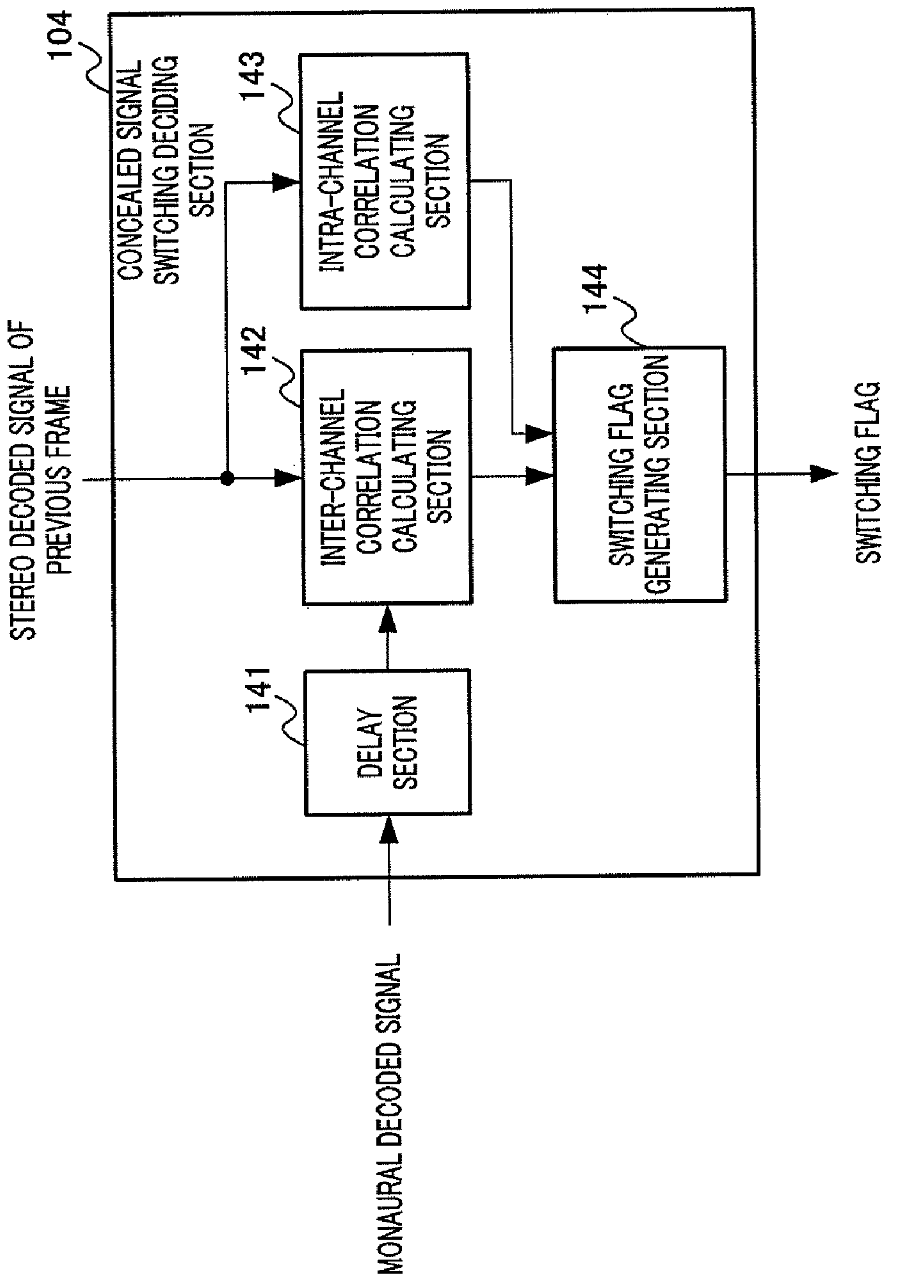
FIG. 2 is a block diagram showing the configuration inside a concealed signal switching deciding section shown in FIG. 1.

FIG. 2 is a block diagram showing the configuration inside concealed signal switching deciding section 104.

In FIG. 2, delay section 141 delays monaural decoded signal Md(n) received as input from monaural signal decoding section 101 by one frame, and outputs monaural decoded signal Mdp(n) of the previous frame to inter-channel correlation calculating section 142.

Inter-channel correlation calculating section 142 calculates cross-correlations c_icc1 and c_icc2 between the monaural signal and the channel signals according to following equations 7 and 8, using monaural decoded signal Mdp(n) of the previous frame received as input from delay section 141 and stereo decoded signals Sdp_ch1($n$) and Sdp_ch2($n$) of the previous frame received as input from delay section 103.

(Equation 7)

$$\mathrm{c\_icc1} = \frac{\left\{\sum_{n=0}^{N-1} \mathrm{Sdp\_ch1}(n)\cdot Mdp(n)\right\}}{\left\{\sum_{n=0}^{N-1} \mathrm{Sdp\_ch1}(n)^2 + \sum_{n=0}^{N-1} Mdp(n)^2\right\}}, \quad [7]$$

$$n = 0, 1, 2, \ldots, N-1$$

(Equation 8)

$$\mathrm{c\_icc2} = \frac{\left\{\sum_{n=0}^{N-1} \mathrm{Sdp\_ch2}(n)\cdot Mdp(n)\right\}}{\left\{\sum_{n=0}^{N-1} \mathrm{Sdp\_ch2}(n)^2 + \sum_{n=0}^{N-1} Mdp(n)^2\right\}}, \quad [8]$$

$$n = 0, 1, 2, \ldots, N-1$$

Further, inter-channel correlation calculating section 142 calculates average value c_icc of c_icc1 and c_icc2 according to following equation 9, and outputs c_icc to switching flag generating section 144 as an average inter-channel correlation value.

(Equation 9)

$$c\_icc=(c\_icc1+c\_icc2)/2 \quad [9]$$

Using stereo decoded signals Sdp_ch1($n$) and Sdp_ch2($n$) of the previous frame received as input from delay section 103, intra-channel correlation calculating section 143 calculates autocorrelations (i.e. pitch correlations) c_ifc1 and c_ifc2 of the channel decoded signals according to following equations 10 and 11.

(Equation 10)

$$\mathrm{c\_ifc1} = \frac{\left\{\sum_{n=0}^{N-1} \mathrm{Sdp\_ch1}(n)\cdot \mathrm{Sdp\_ch1}(n - Tch1)\right\}}{\left\{\begin{array}{l}\sum_{n=0}^{N-1} \mathrm{Sdp\_ch1}(n)^2 + \\ \sum_{n=0}^{N-1} \mathrm{Sdp\_ch1}(n - Tch1)^2\end{array}\right\}}, \quad [10]$$

$$n = 0, 1, 2, \ldots, N-1$$

(Equation 11)

$$\mathrm{c\_ifc2} = \frac{\left\{\sum_{n=0}^{N-1} \mathrm{Sdp\_ch2}(n)\cdot \mathrm{Sdp\_ch2}(n - Tch2)\right\}}{\left\{\begin{array}{l}\sum_{n=0}^{N-1} \mathrm{Sdp\_ch2}(n)^2 + \\ \sum_{n=0}^{N-1} \mathrm{Sdp\_ch2}(n - Tch2)^2\end{array}\right\}}, \quad [11]$$

$$n = 0, 1, 2, \ldots, N-1$$

In equations 10 and 11, Tch1 and Tch2 represent the pitch periods of the first channel signal and second channel signal, respectively. Here, when sample number n is negative, it means that past frames are tracked back.

Further, intra-channel correlation calculating section 143 calculates average value c_ifc of c_ifc1 and c_ifc2 according to following equation 12, and outputs c_ifc to switching flag generating section 144 as an average intra-channel correlation value.

Switching flag generating section 144 generates switching flag Flg_s according to following equation 12, using average inter-channel correlation value c_icc received as input from inter-channel correlation calculating section 142 and average intra-channel correlation value c_ifc received as input from intra-channel correlation calculating section 143, and outputs Flg_s to concealed signal switching section 107.

(Equation 12)

$$\mathrm{Flg\_s} = \begin{cases} 1 & (\mathrm{c\_icc} < \mathrm{TH\_icc},\ \mathrm{c\_ifc} > \mathrm{TH\_ifc}) \\ 0 & (\mathrm{else}) \end{cases} \quad [12]$$

As shown in equation 12, switching flag generating section 144 sets the value of switching flag Flg_s to "1" in a case where average intra-channel correlation value c_ifc is greater than threshold TH_ifc and the average inter-channel correlation value is less than threshold TH_icc, or sets the value of switching flag Flg_s to "0" in other cases. Here, if the value of switching flag Flg_s is 1, it shows that concealment performance by inter-channel concealment is low and concealment performance by intra-channel concealment is high, and concealed signal switching section 107 outputs an intra-channel concealed signal received as input from intra-channel concealment section 106, as a stereo concealed signal. By contrast, if the value of switching flag Flg_s is 0, it shows that the concealment performance by inter-channel concealment is high and the concealment performance by intra-channel concealment is low, and concealed signal switching section 107 outputs an inter-channel concealed signal received as input from inter-channel concealment section 105, as a stereo concealed signal.

Figure 3:
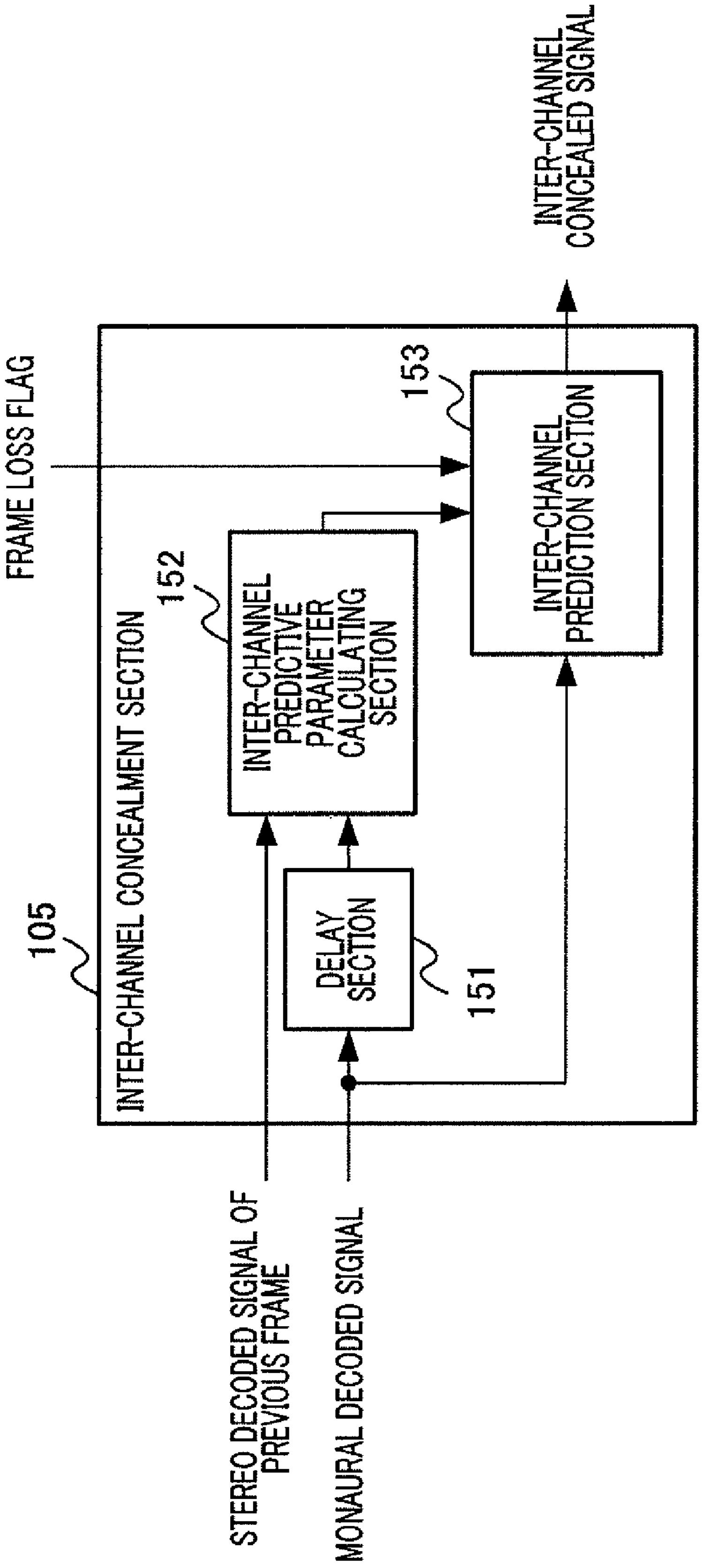
FIG. 3 is a block diagram showing the configuration inside an inter-channel concealment section shown in FIG. 1.

FIG. 3 is a block diagram showing the configuration inside inter-channel concealment section 105.

In FIG. 3, delay section 151 delays monaural decoded signal Md(n) received as input from monaural signal decoding section 101 by one frame, and outputs monaural decoded signal Mdp(n) of the previous frame to inter-channel predictive parameter calculating section 152.

Inter-channel predictive parameter calculating section 152 calculates inter-channel prediction parameters, using monaural decoded signal Mdp(n) of the previous frame received as input from delay section 151 and stereo decoded signals Sdp_ch1($n$) and Sdp_ch2($n$) of the previous frame received as input from delay section 103, and outputs the inter-channel prediction parameters to inter-channel prediction section 153. For example, if inter-channel prediction section 153 performs an inter-channel prediction as shown in following equations 13 and 14, inter-channel predictive parameter calculating section 152 calculates FIR (Finite Impulse Response) filter coefficients a1($k$) and a2($k$) (k=0, 1, 2, . . . , P) that respectively minimize Dist1 and Dist2 shown in following equations 15 and 16, as inter-channel prediction parameters.

(Equation 13)

$$\text{Spr\_ch1}(n) = \sum_{k=0}^{P} a1(k) \cdot Mdp(n-k), \quad n = 0, 1, 2, \ldots, N-1 \tag{13}$$

Equation 14

$$\text{Spr\_ch2}(n) = \sum_{k=0}^{P} a2(k) \cdot Mdp(n-k), \quad n = 0, 1, 2, \ldots, N-1 \tag{14}$$

(Equation 15)

$$Dist1 = \sum_{k=0}^{N-1} \{\text{Sds\_ch1}(n) - \text{Spr\_ch1}(n)\}^2, \quad n = 0, 1, 2, \ldots, N-1 \tag{15}$$

(Equation 16)

$$Dist2 = \sum_{k=0}^{N-1} \{\text{Sds\_ch2}(n) - \text{Spr\_ch2}(n)\}^2, \quad n = 0, 1, 2, \ldots, N-1 \tag{16}$$

In equations 13 and 14, channel prediction signals Spr_ch1($n$) and Spr_ch2($n$) represent the channel prediction signals acquired by predicting channel decoded signals Sdp_ch1($n$) and Sdp_ch2($n$) of the previous frame from monaural decoded signal Mdp(n) of the previous frame, using FIR filter coefficients a1($k$) and a2($k$) as inter-channel prediction parameters, for example. Also, in equations 15 and 16, Dist1 represents the square error between stereo decoded signal Sdp_ch1($n$) and stereo prediction signal Spr_ch1($n$), and Dist2 represents the square error between stereo decoded signal Sdp_ch2($n$) and stereo prediction signal Spr_ch2($n$).

If an input frame loss flag indicates a loss, inter-channel prediction section 153 predicts stereo decoded signals of the current frame from monaural decoded signal Md(n) of the current frame according to following equations 17 and 18, using inter-channel prediction parameters a1($k$) and a2($k$) (k=0, 1, 2, . . . , P) received as input from inter-channel predictive parameter calculating section 152. Further, inter-channel prediction section 153 outputs the resulting stereo prediction signals to concealed signal switching section 107 as inter-channel concealed signals (i.e. first inter-channel concealed signal Sk_ch1($n$) and second inter-channel concealed signal Sk_ch2($n$)).

(Equation 17)

$$\text{Sk\_ch1}(n) = \sum_{k=0}^{P} a1(k) \cdot Md(n-k), \quad n = 0, 1, 2, \ldots, N-1 \tag{17}$$

(Equation 18)

$$\text{Sk\_ch2}(n) = \sum_{k=0}^{P} a2(k) \cdot Md(n-k), \quad n = 0, 1, 2, \ldots, N-1 \tag{18}$$

Also, referring to the frame loss flag, if frames are lost consecutively, inter-channel prediction section 153 may attenuate the amplitude of inter-channel concealed signals to be outputted, depending on the number of frames consecutively lost.

Figure 4:
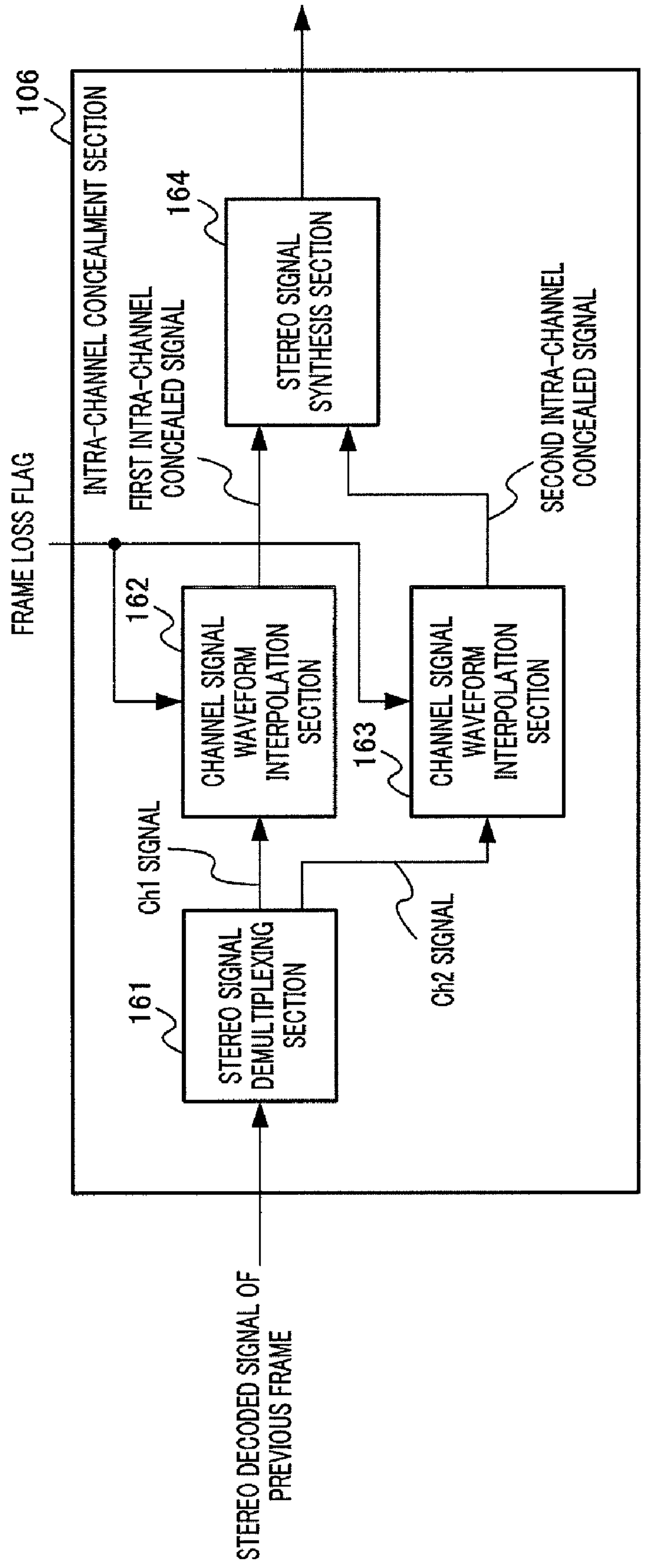
FIG. 4 is a block diagram showing the configuration inside an intra-channel concealment section shown in FIG. 1.

FIG. 4 is a block diagram showing the configuration inside intra-channel concealment section 106. An example case will be explained below where intra-channel concealment section 106 performs an intra-channel concealment without using monaural decoded signal Md(n) received as input from monaural signal decoding section 101.

In FIG. 4, intra-channel concealment section 106 is provided with stereo signal demultiplexing section 161, channel signal waveform interpolation section 162, channel signal waveform interpolation section 163 and stereo signal synthesis section 164.

Stereo signal demultiplexing section 161 demultiplexes a stereo decoded signal of the previous frame received as input from delay section 103, into first channel decoded signal Sdp_ch1($n$) and second channel decoded signal Sdp_ch2($n$), and outputs these signals to channel signal waveform interpolation section 162 and channel signal waveform interpolation section 163, respectively.

Channel signal waveform interpolation section 162 performs intra-channel concealment processing by waveform interpolation using first channel decoded signal Sdp_ch1($n$) of the previous frame received as input from stereo signal demultiplexing section 161, and outputs resulting first intra-channel concealed signal Sd_ch1($n$) to stereo signal synthesis section 164.

Channel signal waveform interpolation section 163 performs intra-channel concealment processing by waveform interpolation using second channel decoded signal Sdp_ch2($n$) of the previous frame received as input from stereo signal demultiplexing section 161, and outputs resulting second intra-channel concealed signal Sd_ch2($n$) to stereo signal synthesis section 164. Here, channel signal waveform interpolation section 162 and channel signal waveform interpolation section 163 will be described later in detail.

Stereo signal synthesis section 164 performs a synthesis using first intra-channel concealed signal Sd_ch1($n$) received as input from channel signal waveform interpolation section 162 and second intra-channel concealed signal Sd_ch2($n$) received as input from channel signal waveform interpolation section 163, and outputs the resulting stereo synthesis signal to concealed signal switching section 107 as an intra-channel concealed signal.

Figure 5:
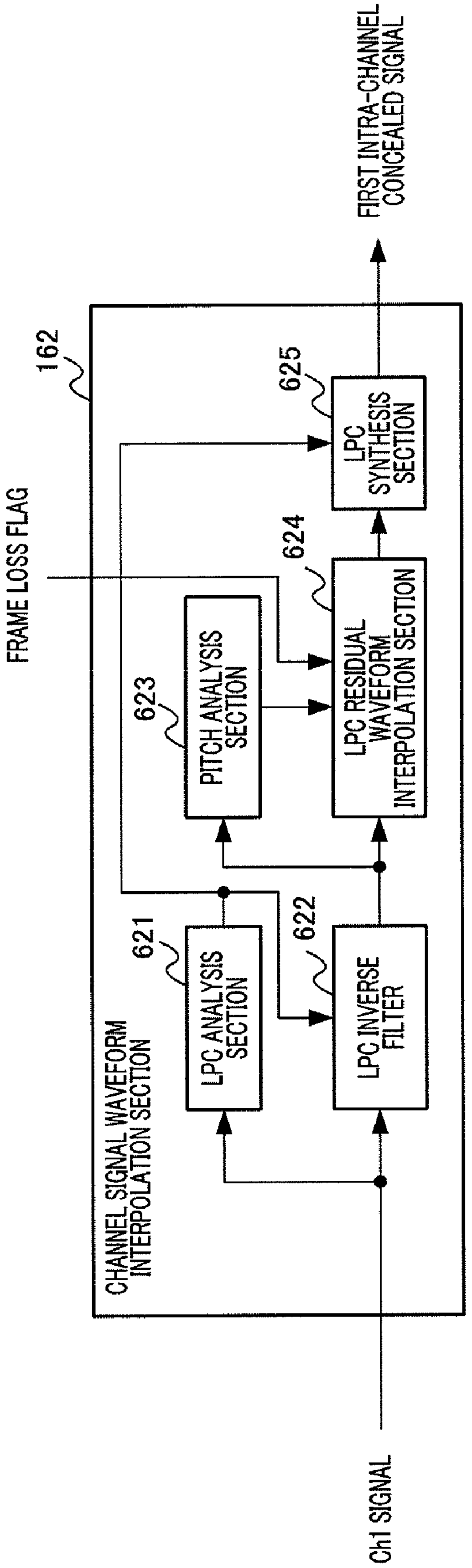
FIG. 5 is a block diagram showing the configuration inside a channel signal waveform interpolation section shown in FIG. 4.

FIG. 5 is a block diagram showing the configuration inside channel signal waveform interpolation section 162.

LPC analysis section 621 performs a linear predictive analysis of first channel decoded signal Sdp_ch1($n$) of the previous frame received as input from stereo signal demultiplexing section 161, and outputs the resulting linear predictive coefficients (LPC cofficients) to LPC inverse filter 622 and LPC synthesis filter 625.

LPC inverse filter 622 performs LPC inverse filtering processing of first channel decoded signal Sdp_ch1($n$) of the previous frame received as input from stereo signal demultiplexing section 161, using the LPC coefficients received as input from LPC analysis section 621, and outputs the resulting LPC residual signal to pitch analysis section 623 and LPC residual waveform interpolation section 624.

Pitch analysis section 623 performs a pitch analysis of the LPC residual signal received as input from LPC inverse filter 622, and outputs the resulting pitch period and pitch predictive gain to LPC residual waveform interpolation section 624.

If an input frame loss flag indicates a loss, using the pitch period and pitch predictive gain received as input from pitch analysis section 623, LPC residual waveform interpolation section 624 generates an LPC residual signal of the current frame by performing a waveform interpolation using the LPC residual signal of the previous frame received as input from LPC inverse filter 622. For example, with waveform interpolation, an interpolation waveform is generated by extracting one pitch period of a periodic waveform from the LPC residual signal of the previous frame, multiplying the periodic waveform by the pitch period gain and periodically placing the result, or by applying filter processing to the LPC residual signal of the previous frame by a pitch prediction filter using the pitch period and pitch predictive gain as parameters.

Also, in a frame in which the pitch periodicity of an LPC residual signal is low such as unvoiced speech signals or non-speech period without speech (e.g. noise signal period), LPC residual waveform interpolation section 624 may add noise component signals to interpolation signals for a pitch periodic waveform or replace interpolation signals for the pitch periodic waveform with noise component signals. Also, referring to the frame loss flag, if frames are lost consecutively, LPC residual waveform interpolation section 624 may attenuate the amplitude of the generated interpolation signal, depending on the number of frames consecutively lost.

LPC synthesis section 625 performs LPC synthesis processing using the LPC coefficients received as input from LPC analysis section 621 and the LPC residual signal of the current frame received as input from LPC residual waveform interpolation section 624, and outputs the resulting synthesis signal to stereo signal synthesis section 164 as a first intra-channel concealed signal.

The internal configuration and operations of channel signal waveform interpolation section 163 are basically the same as channel signal waveform interpolation section 162, and differ from channel signal waveform interpolation section 162 only in that the processing target is a first channel decoded signal in channel signal waveform interpolation section 162 and the processing target is a second channel decoded signal in channel signal waveform interpolation section 163. Therefore, explanation of the internal configuration and operations of channel signal waveform interpolation section 163 will be omitted.

Figure 6:
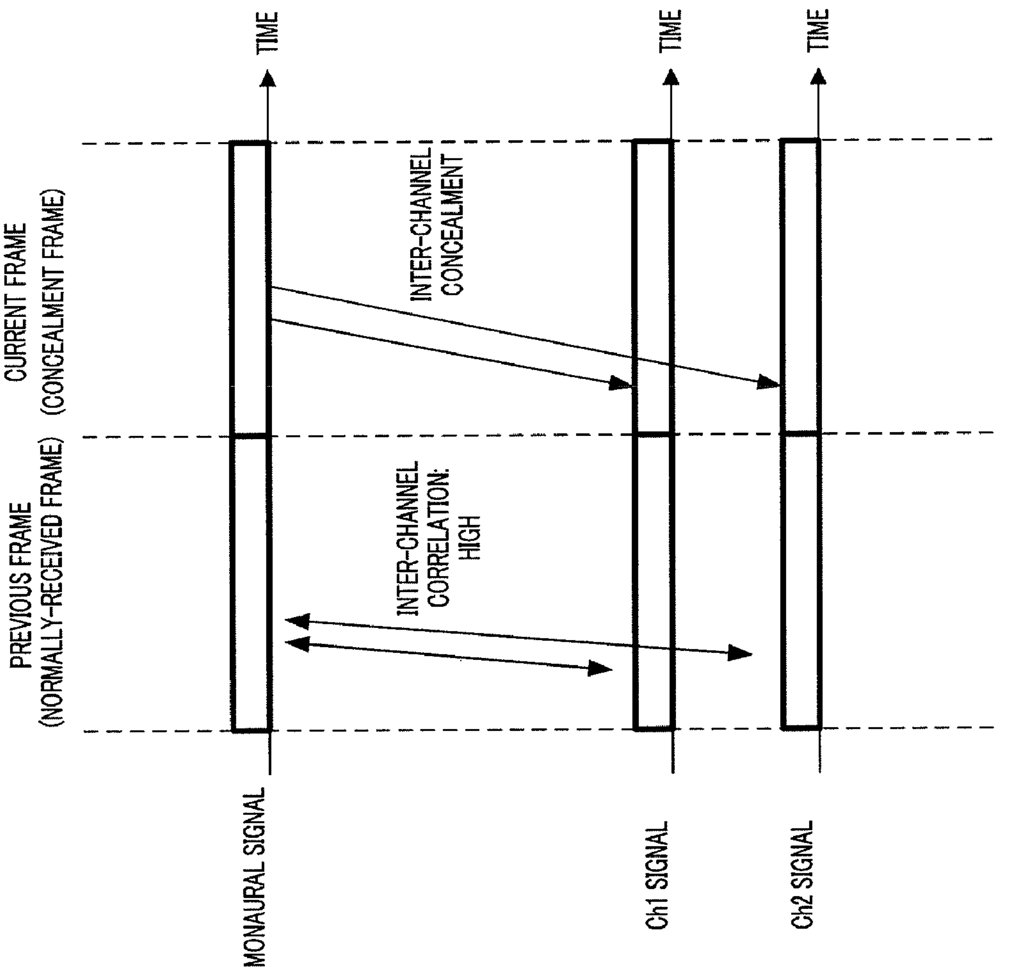
FIG. 6 conceptually illustrates operations of inter-channel concealment according to Embodiment 1 of the present invention.
Figure 7:
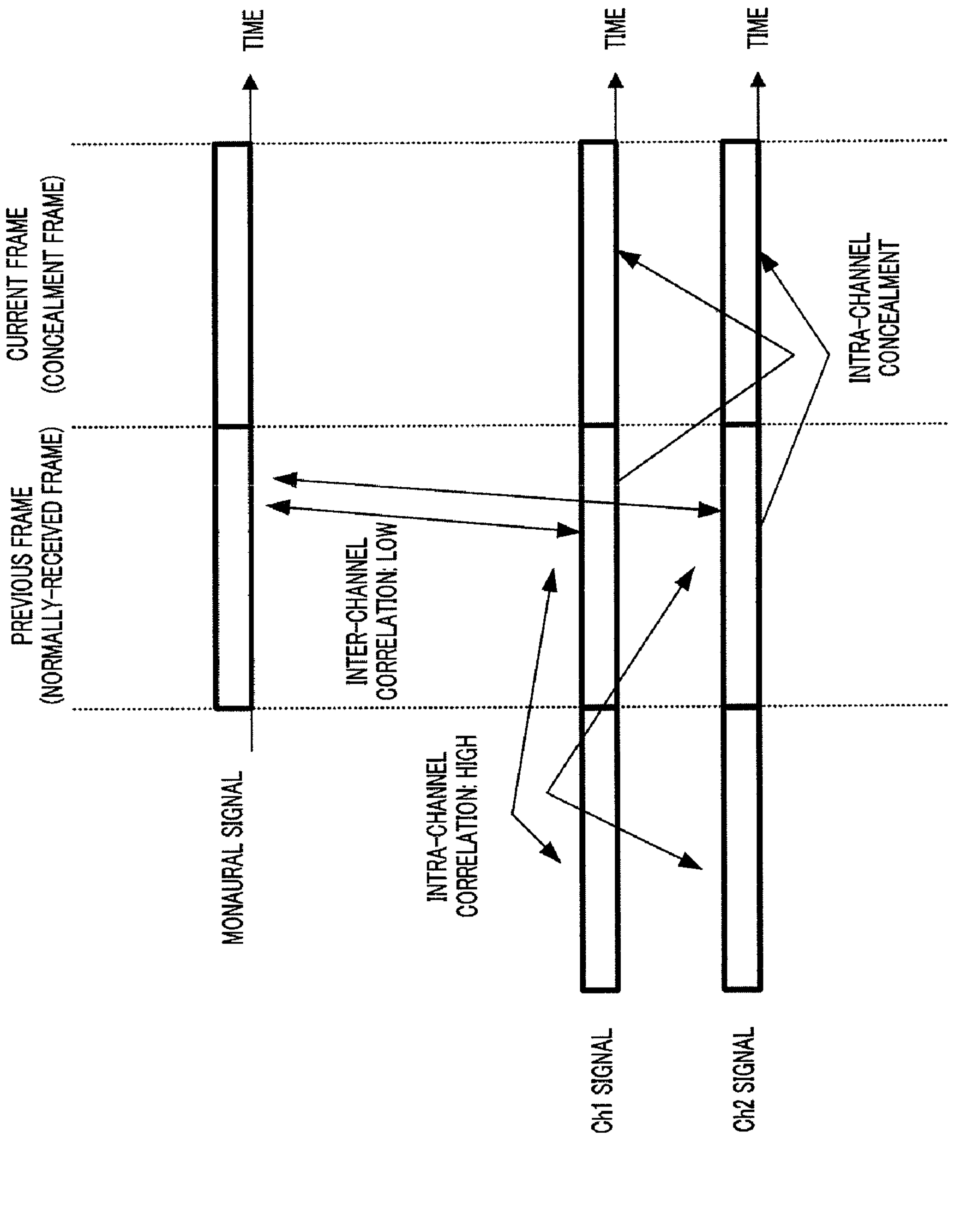
FIG. 7 conceptually illustrates operations of intra-channel concealment according to Embodiment 1 of the present invention.

FIG. 6 and FIG. 7 conceptually illustrate the operations of inter-channel concealment and intra-channel concealment in speech decoding apparatus 100.

FIG. 6 conceptually illustrate the operations of inter-channel concealment. As shown in FIG. 6, if inter-channel correlation is high, that is, if switching flag generating section 144 generates switching flag Flg_s of the value "0," concealed signal switching section 107 selects a signal generated in inter-channel concealment section 105, that is, an inter-channel concealed signal comprised of the first inter-channel concealed signal and second inter-channel concealed signal of the current frame acquired by performing an inter-channel concealment based on the monaural decoded signal of the current frame.

FIG. 7 conceptually illustrates the operations of intra-channel concealment. As shown in FIG. 7, if intra-channel correlation is high, that is, if switching flag generating section 144 generates switching flag Flg_s of the value "1," concealed signal switching section 107 selects a signal generated in intra-channel concealment section 106, that is, an intra-channel concealed signal comprised of the first intra-channel concealed signal and second intra-channel concealed signal of the current frame acquired by performing an intra-channel concealment based on the first channel decoded signal and second channel decoded signal of a past frame.

Thus, according to the present embodiment, if side signal encoded data of the current frame transmitted from the speech encoding apparatus is lost, the speech decoding apparatus with a monaural-stereo scalable configuration compares a threshold with an inter-channel correlation and intra-channel correlation calculated using the decoded signals of a past frame, and, based on this comparison result, switches a stereo concealed signal to the signal of the higher concealment performance between the inter-channel concealed signal and the intra-channel concealed signal, so that it is possible to improve the quality of decoded speech. That is, an intra-channel correlation is taken into account even if an inter-channel correlation is low, and, if this intra-channel correlation is high, by performing an interpolation from past channel signals in channel signals, it is possible to suppress the degradation due to concealment, perform concealment maintaining the stereo level and improve the quality of decoded speech.

Also, although an example case has been described above with the present embodiment where only one frame of a past frame is used as a past frame used in calculating an inter-channel correlation and intra-channel correlation and performing an intra-channel concealment, the present invention is not limited to this, and it is equally possible to calculate the inter-channel correlation and intra-channel correlation and perform an intra-channel concealment using two or more frames of the past frame.

Also, although an example case has been described above with the present embodiment where, if side signal encoded data of the current frame is lost, inter-channel concealment section 105 and intra-channel concealment section 106 both operate and concealed signal switching section 107 chooses one of an inter-channel concealed signal and intra-channel concealed signal generated, the present invention is not limited to this. Here, it is equally possible to employ a configuration in which only one of inter-channel concealment section 105 and intra-channel concealment section 106 operates depending on a decision result in concealed signal switching deciding section 104 (e.g. a configuration in which concealed signal switching section 107 is placed before inter-channel concealment section 105 and intra-channel concealment section 106).

Also, although an example case has been described above with the present embodiment where monaural signal encoded data of the current frame is normally received and only side signal encoded data is lost, the present invention is not limited to this, and is applicable to a case where monaural signal encoded data and side signal encoded data are both lost. In this case, first, monaural signal decoding section 101 needs to conceal a monaural decoded signal by an arbitrary lost frame concealment method, and, using the resulting monaural concealed signal, a stereo concealed signal needs to be generated by the concealed signal switching method explained with the present embodiment.

Also, although an example case has been described above with the present embodiment where switching flag generating section 144 generates switching flag Flg_s according to above equation 12 and outputs Flg_s to concealed signal switching section 107, the present invention is not limited to this. Here, it is equally possible to further classify cases where the value of switching flag Flg_s in equation 12 is "0," into a case where the average inter-channel correlation value is greater than threshold TH_icc (in this case, the value of Flg_s is "0") and a case where the average inter-channel correlation value is less than threshold TH_icc (in this case, the value of Flg_s is "2," and intra-channel correlation value c_ifc is also less than threshold TH_ifc), and output respective values of Flg_s. Here, inter-cannel concealment section 105 performs the same processing as above when the value of Flg_s is "0," while, when the value of Flg_s is "2," it is estimated that the inter-channel correlation is low and inter-channel concealment performance is not high, and therefore inter-channel concealment section 105 may correct the channel concealed signals of a stereo concealed signal acquired by inter-channel concealment to resemble a monaural decoded signal, or may output the monaural decoded signal as is as a concealed signal.

Also, although an example case has been described above with the present embodiment where inter-channel correlation calculating section 142 calculates an average value of cross-correlations between a monaural decoded signal and channel decoded signals of the previous frame, the present invention is not limited to this, and it is equally possible to calculate the cross-correlation between a first channel decoded signal and second channel decoded signal of the previous frame, or calculate the predictive gain value acquired by an inter-channel prediction performed in inter-channel concealment section 105. Here, the predictive gain value refers to an average value of the predictive gain of a first channel prediction signal, which is acquired by predicting the first channel decoded signal based on the monaural decoded signal, and the predictive gain of a second channel prediction signal, which is acquired by predicting the second channel decoded signal based on the monaural decoded signal.

Also, according to the present invention, upon calculating cross-correlations c_icc1 and c_icc2 between a monaural decoded signal and channel decoded signals of the previous frame, inter-channel correlation calculating section 142 may further take into account the delay difference between the monaural decoded signal and the channel decoded signals. That is, inter-channel correlation calculating section 142 may calculate cross-correlations after shifting one of the monaural decoded signal and the channel decoded signals by a delay difference which maximizes the cross-correlations or similarities between the monaural decoded signal and the channel decoded signals.

Also, according to the present invention inter-channel correlation calculating section 142 may calculate the cross-correlations between signals acquired by applying band split to a monaural decoded signal and channel decoded signals of the previous frame.

Also, although an example case has been described above with the present embodiment where intra-channel correlation calculating section 143 calculates intra-channel correlations according to above equations 10 and 11 using pitch periods Tch1 and Tch2 of a first channel signal and second channel signal, the present invention is not limited to this. Here, instead of pitch periods, intra-channel correlation calculating section 143 may use delay values to maximize autocorrelations c_ifc1 and c_ifc2 of channel decoded signals or maximize the numerator terms of above equations 10 and 11, as Tch1 and Tch2 in equations 10 and 11.

Also, although an example case has been described above with the present embodiment where, using a first channel decoded signal and second channel decoded signal as targets, intra-channel correlation calculating section 143 calculates the autocorrelations of the channel decoded signals according to above equations 10 and 11, the present invention is not limited to this, and, using the LPC residual signals of the first channel decoded signal and second channel decoded signal as targets, intra-channel correlation calculating section 143 may calculate the autocorrelations of the channel decoded signals according to above equations 10 and 11.

Also, although an example case has been described above with the present embodiment where inter-channel concealment section 105 performs predictions as shown in above equations 13, 14, 17 and 18, the present invention is not limited to this, and inter-channel concealment section 105 may perform a prediction using only the delay difference and amplitude ratio between signals or perform a prediction using combinations of the delay difference and the above FIR filter coefficients.

Also, although an example case has been described above with the present embodiment where inter-channel concealment section 105 performs an inter-channel prediction as an inter-channel concealment operation, the present invention is not limited to this, and it is equally possible to perform an inter-channel concealment by an arbitrary method other than inter-channel prediction. For example, inter-channel concealment section 105 may calculate a stereo decoded signal of the current frame, using decoded parameters acquired by processing a past frame in stereo signal decoding section 102. Alternatively, first, inter-channel concealment section 105 may conceal a side decoded signal of the current frame using a side decoded signal acquired by decoding past side signal encoded data, and then calculate a stereo decoded signal of the current frame.

Also, an example case has been described above with the present embodiment where intra-channel concealment section 106 performs a waveform interpolation of an LPC residual signal as intra-channel concealment processing, the present invention is not limited to this, and it is equally possible to directly perform a waveform interpolation of a stereo decoded signal as intra-channel concealment processing.

Also, although an example case has been described above with the present embodiment where intra-channel concealment section 106 calculates pitch parameters or LPC parameters for intra-channel concealment processing, the present invention is not limited to this, and, if pitch parameters or LPC parameters of a monaural signal can be acquired in the decoding process of the current frame in monaural signal decoding section 101, intra-channel concealment section 106 may use these parameters for intra-channel concealment processing. In this case, these parameters need not be newly calculated in intra-channel concealment section 106, so that it is possible to reduce the amount of calculations.

Also, although an example case has been described above with the present embodiment where speech decoding apparatus 100 switches between an intra-channel concealed signal and inter-channel concealed signal according to the inter-channel correlation degree and intra-channel correlation degree, the present invention is not limited to this, and it is equally possible to generate a concealed signal by the weighted sum of an intra-channel concealed signal and inter-channel concealed signal according to inter-channel correlation and intra-channel correlation. As for weighting based on inter-channel correlation and intra-channel correlation, for example, the weight for an inter-channel concealed signal is increased when the inter-channel correlation is higher, and, by contrast, the weight for an intra-channel concealed signal is increased when the intra-channel correlation is higher.

Embodiment 2

According to Embodiment 1, intra-channel concealment section 106 performs an intra-channel concealment of a first channel decoded signal and second channel decoded signal. By contrast with this, according to Embodiment 2, an intra-channel concealment is performed only for the channel signal with the higher intra-channel correlation between the first channel decoded signal and the second channel decoded signal, and, using the resulting intra-channel concealed signal and monaural decoded signal, the other channel signal is calculated.

The speech decoding apparatus according to the present embodiment (not shown) is basically the same as speech decoding apparatus 100 shown in Embodiment 1 (see FIG. 1), and differs from speech decoding apparatus 100 only in providing intra-channel concealment section 206 instead of intra-channel concealment section 106.

Figure 8:
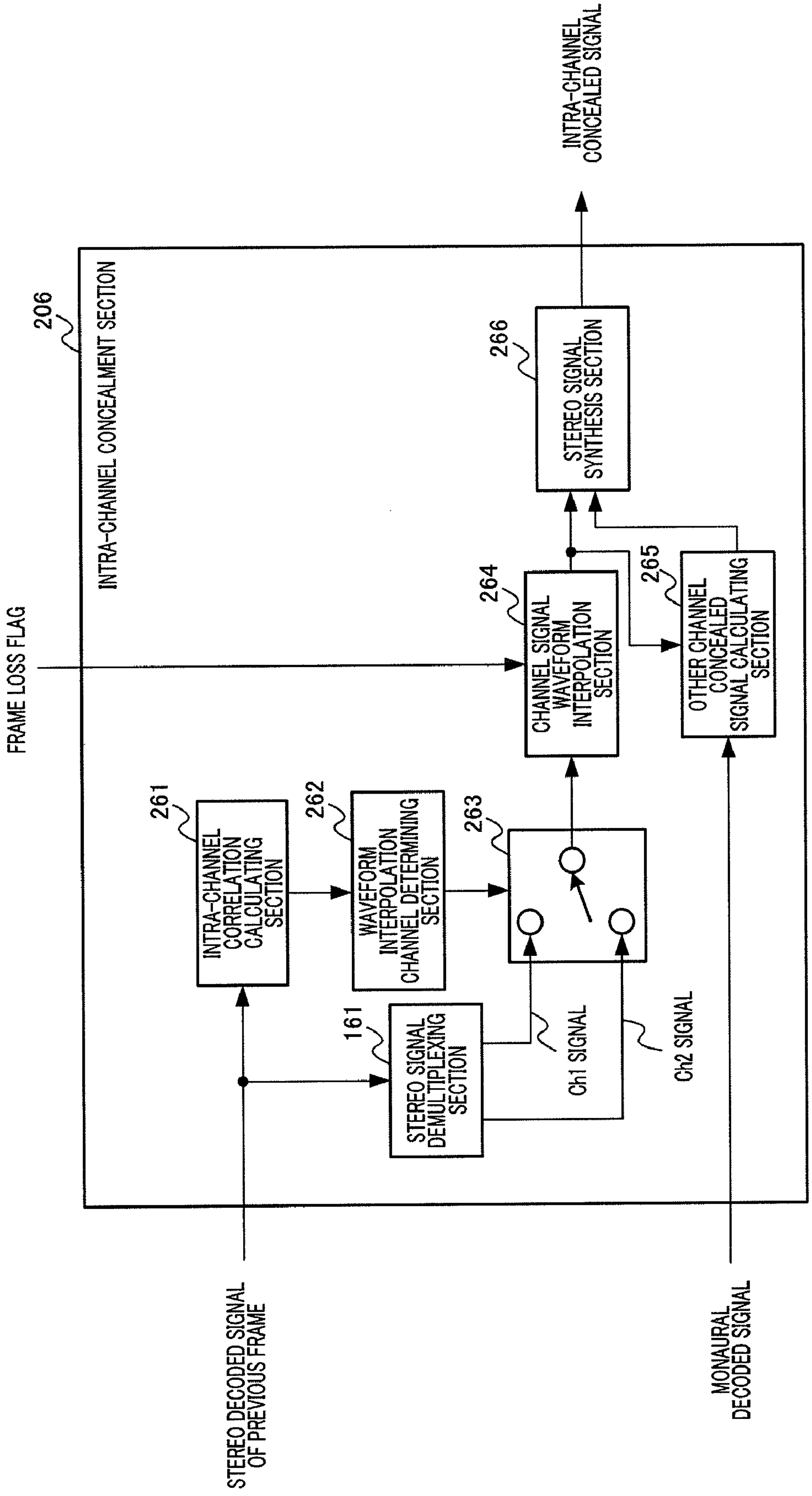
FIG. 8 is a block diagram showing the configuration inside an intra-channel concealment section according to Embodiment 2 of the present invention.

FIG. 8 is a block diagram showing the configuration inside intra-channel concealment section 206 according to the present embodiment. Also, intra-channel concealment section 206 performs an intra-channel concealment, further using monaural decoded signal Md(n) received as input from monaural signal decoding section 101.

Intra-channel concealment section 206 shown in FIG. 8 is provided with intra-channel correlation calculating section 261, waveform interpolation channel determining section 262, switch 263, channel signal waveform interpolation section 264, other channel concealed signal calculating section 265 and stereo signal synthesis section 266, in addition to stereo signal demultiplexing section 161 provided in intra-channel concealment section 106 shown in FIG. 4.

Using stereo decoded signals Sdp_ch1(*n*) and Sdp_ch2(*n*) of the previous frame received as input from delay section 103, intra-channel correlation calculating section 261 calculates autocorrelations (i.e. pitch correlations) c_ifc1 and c_ifc2 of the channel decoded signals according to above equations 10 and 11, and outputs c_ifc1 and c_ifc2 to waveform interpolation determining section 262.

Waveform interpolation channel determining section 262 compares autocorrelation c_cifc1 of the first channel decoded signal and autocorrelation c_cifc2 of the second channel decoded signal, which are received as input from intra-channel correlation calculating section 261, determines the channel of the higher autocorrelation as a waveform interpolation channel and outputs the determination result to switch 263. An example case will be explained below where waveform interpolation channel determining section 262 determines the first channel as a waveform interpolation channel.

Switch 263 outputs, to channel signal waveform interpolation section 264, the channel which is determined, based on the waveform interpolation channel determination result received as input from waveform interpolation channel determining section 262, as a waveform interpolation channel from first channel decoded signal Sdp_ch1(*n*) and second channel decoded signal Sdp_ch2(*n*) received as input from stereo signal demultiplexing section 161 (in this example, switch 263 outputs first channel decoded signal Sdp_ch1(*n*)).

Channel signal waveform interpolation section 264 is basically the same as channel signal waveform interpolation section 162 (see FIG. 5) shown in Embodiment 1, and differs from channel signal waveform interpolation section 162 in that the processing target of waveform interpolation is one of channels received as input from switch 263 (in this example, the first channel). Further, channel signal waveform interpolation section 264 outputs first intra-channel concealed signal Sd_ch1(*n*) acquired by waveform interpolation, to other channel concealed signal calculating section 265 and stereo signal synthesis section 266.

Other channel concealed signal calculating section 265 calculates second intra-channel concealed signal Sd_ch2(*r*) according to following equation 19, using first intra-channel concealed signal Sd_ch1(*n*) received as input from channel signal waveform interpolation section 264 and monaural decoded signal Md(n) received as input from monaural signal decoding section 101, and outputs Sd_ch2(*r*) to stereo signal synthesis section 266.

(Equation 19)

$$Sd\_ch2(n)=2\cdot Md(n)-Sd\_ch1(n),\ n=0,1,2,\ldots,N-1 \qquad [19]$$

Stereo signal synthesis section 266 performs a synthesis using first intra-channel concealed signal Sd_ch1(*n*) received as input from channel signal waveform interpolation section 264 and second intra-channel concealed signal Sd_ch2(*n*) received as input from other channel concealed signal calculating section 265, and outputs the resulting stereo synthesis signal to concealed signal switching section 107 as an intra-channel concealed signal.

Thus, according to the present embodiment, if side signal encoded data of the current frame transmitted from the speech encoding apparatus is lost, the speech decoding apparatus with a monaural-stereo scalable configuration switches a stereo concealed signal to the signal of the higher concealment performance between an inter-channel concealed signal and intra-channel concealed signal, based on a result of comparing a threshold with an inter-channel correlation and intra-channel correlation calculated using decoded signals of a past frame. Further, the speech decoding apparatus with a monaural-stereo scalable configuration compares intra-channel autocorrelations, performs an intra-channel concealment only for the channel signal with the higher autocorrelation (i.e. the channel signal with high intra-channel correlation in which high intra-channel concealment performance is estimated), and generates a concealed signal based on the relationship between a monaural signal and channel signals using a monaural decoded signal which is decoded correctly, instead of performing an intra-channel concealment for the other channel, so that it is possible to further improve the quality of lost frame concealment and improve the quality of decoded speech.

Embodiment 3

The speech decoding apparatus according to Embodiment 3 generates a monaural signal using a stereo concealed signal acquired by the intra-channel concealment method shown in Embodiment 1, and calculates the similarity between the generated monaural signal and monaural signal encoded data received normally. Further, if the similarity is equal to or less than a predetermined threshold, the speech decoding apparatus substitutes a monaural decoded signal for a stereo concealed signal.

Figure 9:
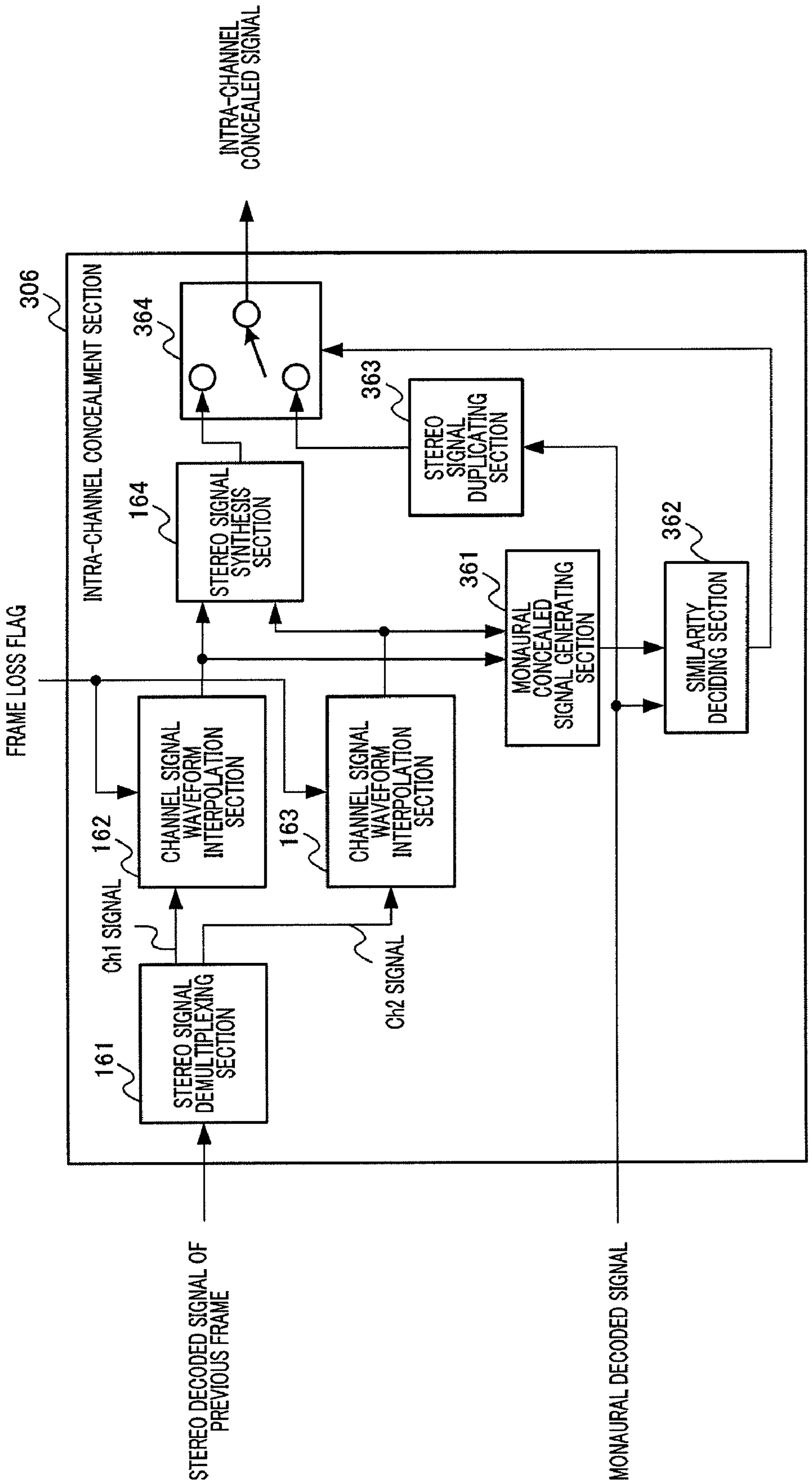
FIG. 9 is a block diagram showing the configuration inside an intra-channel concealment section according to Embodiment 3 of the present invention.

FIG. 9 is a block diagram showing the configuration inside intra-channel concealment section 306 according to the present embodiment. Here, intra-channel concealment section 306 shown in FIG. 9 is provided with monaural concealed signal generating section 361, similarity deciding section 362, stereo signal duplicating section 363 and switch 364, in addition to intra-channel concealment section 106 shown in FIG. 1.

Monaural concealed signal generating section 361 calculates monaural concealed signal Mr(n) according to following equation 20, using first intra-channel concealed signal Sd_ch1(*n*) received as input from channel signal waveform interpolation section 162 and second intra-channel concealed signal Sd_ch2(*n*) received as input from channel signal waveform interpolation section 163, and outputs Mr(n) to similarity deciding section 362.

(Equation 20)

$$Mr(n)=\{Sd\_ch1(n)+Sd\_ch2(n)\}/2,\ n=0,1,\ldots,N-1 \quad [20]$$

Similarity deciding section 362 calculates the similarity between monaural concealed signal Mr(n) received as input from monaural concealed signal generating section 361 and monaural decoded signal Md(n) received as input from monaural signal decoding section 101, decides whether or not the calculated similarity is equal to or greater than a threshold, and outputs the decision result to switch 364. Here, examples of similarity between monaural concealed signal Mr(n) and monaural decoded signal Md(n) include the cross-correlation between these two signals, the reciprocal of the mean error between these signals, the reciprocal of the square sum of the error between these signals, the SNR between these signals (i.e. the signal to noise ratio of an error signal between signals, with respect to one of those signals), and so on.

Stereo signal duplicating section 363 duplicates monaural decoded signal Md(n) received as input from monaural signal decoding section 101, as a concealed signal of channels, and outputs a generated stereo duplication signal to switch 364

Based on the decision result received as input from similarity deciding section 362, switch 364 outputs a stereo synthesis signal received as input from stereo signal synthesis section 164 as an intra-channel concealed signal if the similarity between monaural concealed signal Mr(n) and monaural decoded signal Md(n) is equal to or greater than a threshold, or outputs the stereo duplication signal received as input from stereo signal duplicating section 363 as an intra-channel concealed signal if the similarity between monaural concealed signal Mr(n) and monaural decoded signal Md(n) is less than a threshold.

Thus, according to the present embodiment, in intra-channel concealment processing in the speech decoding apparatus, if the similarity between a monaural concealed signal and monaural decoded signal is equal to or greater than a threshold, an intra-channel concealed signal is produced by performing a synthesis using a first intra-channel concealed signal and second intra-channel concealed signal acquired by waveform interpolation, or, if that similarity is less than a threshold, an intra-channel concealed signal of channels is produced by duplicating the monaural decoded signal, where the monaural concealed signal is generated using the first intra-channel concealed signal and second intra-channel concealed signal acquired by waveform interpolation, and where the monaural decoded signal is produced by decoding monaural signal encoded data. Thus, upon intra-channel concealment, by examining concealment performance using a monaural decoded signal, that is, by referring to the similarity of waveforms between a monaural concealed signal calculated using a stereo concealed signal acquired by intra-channel concealment and a monaural decoded signal which is decoded correctly, deciding that an intra-channel concealment is not performed adequately if the similarity is low, and not using that stereo concealed signal as a concealed signal, it is possible to prevent the degradation of concealment performance which can be caused by intra-channel concealment, further improve intra-channel concealment performance of the speech decoding apparatus and improve the quality of decoded speech.

Embodiment 4

In Embodiment 4, the encoding side decides the switching of stereo concealed signals and outputs a decision result to the decoding side.

Figure 10:
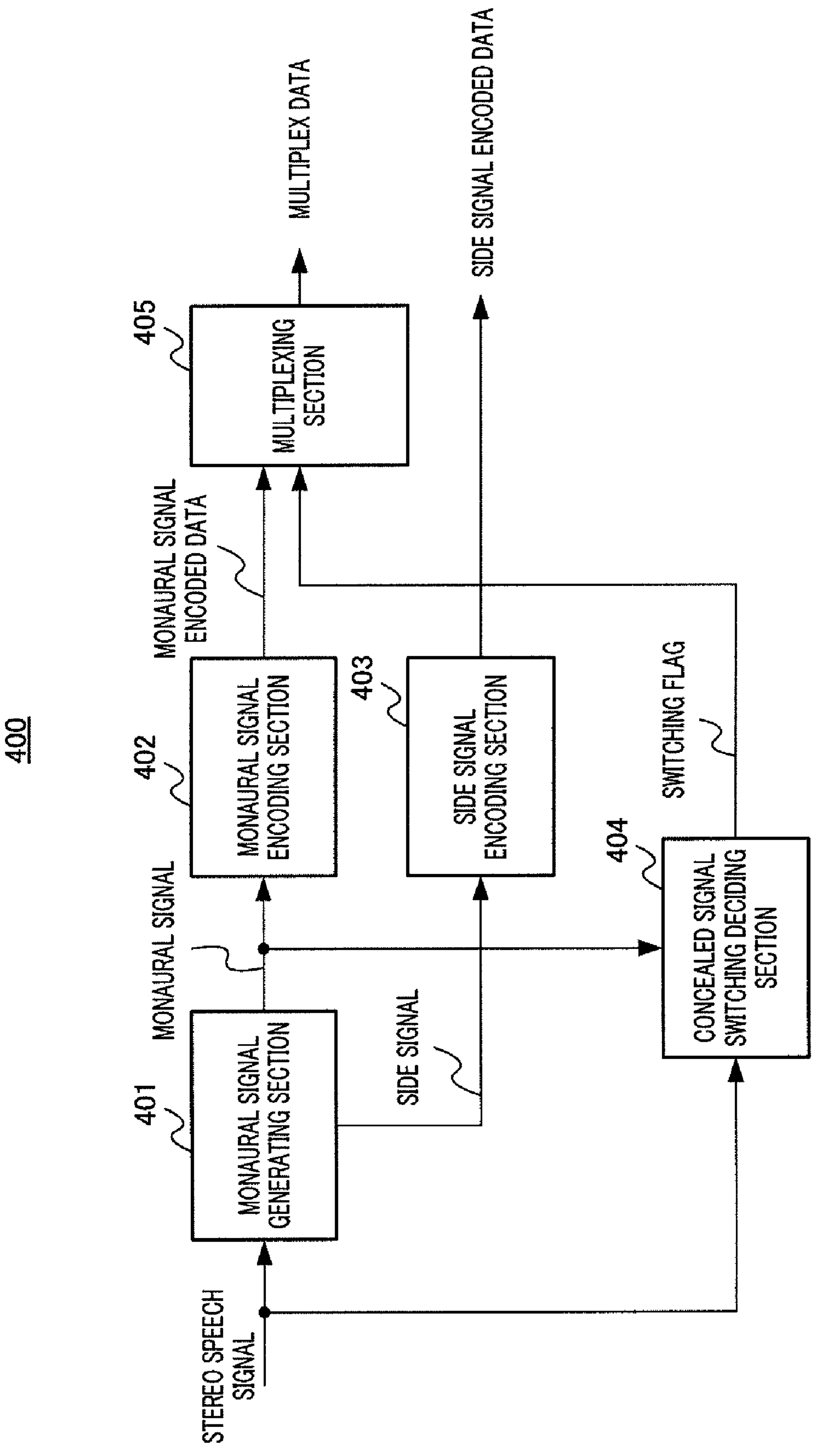
FIG. 10 is a block diagram showing the main components of a speech encoding apparatus according to Embodiment 4 of the present invention.

FIG. 10 is a block diagram showing the main components of speech encoding apparatus 400 according to the present embodiment.

In FIG. 10, speech encoding apparatus 400 is provided with monaural signal generating section 401, monaural signal encoding section 402, side signal encoding section 403, concealed signal switching deciding section 404 and multiplexing section 405.

Monaural signal generating section 401 generates monaural signal M(n) and side signal S(n) according to above equations 1 and 2, using first channel signal S_ch1(*n*) and second channel signal S_ch2(*n*) of an input stereo speech signal. Further, monaural signal generating section 401 outputs generated monaural signal M(n) to monaural signal encoding section 402 and outputs side signal S(n) to side signal encoding section 403.

Monaural signal encoding section 402 encodes monaural signal M(n) received as input from monaural signal generating section 401, and outputs generated monaural signal encoded data to multiplexing section 405.

Side signal encoding section 403 encodes side signal S(n) received as input from monaural signal generating section 401, and outputs generated side signal encoded data to speech decoding apparatus 500, which will be described later.

Concealed signal switching deciding section 404 is basically the same as concealed signal switching deciding section 104 (see FIG. 2) shown in Embodiment 1, and differs from concealed signal switching deciding section 104 only in deciding the switching of a concealed signal using stereo signals S_ch1(*n*) and S_ch2(*n*) and monaural signal M(n) of the current frame, instead of stereo signals Sdp_ch1($n$) and Sdp_ch2($n$) and monaural decoded signal Mdp(n) of the previous frame. That is, based on the inter-channel correlation degree and intra-channel correlation degree calculated using stereo signals S_ch1($n$) and S_ch2($n$) and monaural signal M(n) of the current frame, concealed signal switching deciding section 404 decides which of an inter-channel concealed signal acquired in inter-channel concealment section 105 and intra-channel concealed signal acquired in intra-channel concealment section 106 is used as stereo concealed signal, and outputs a switching flag indicating the decision result to multiplexing section 405.

Multiplexing section 405 multiplexes the monaural signal encoded data received as input from monaural signal encoding section 402 and the switching flag received as input from concealed signal switching deciding section 404, and outputs the resulting multiplex data as monaural signal encoded layer data to speech decoding apparatus 500, which will be described later.

Figure 11:
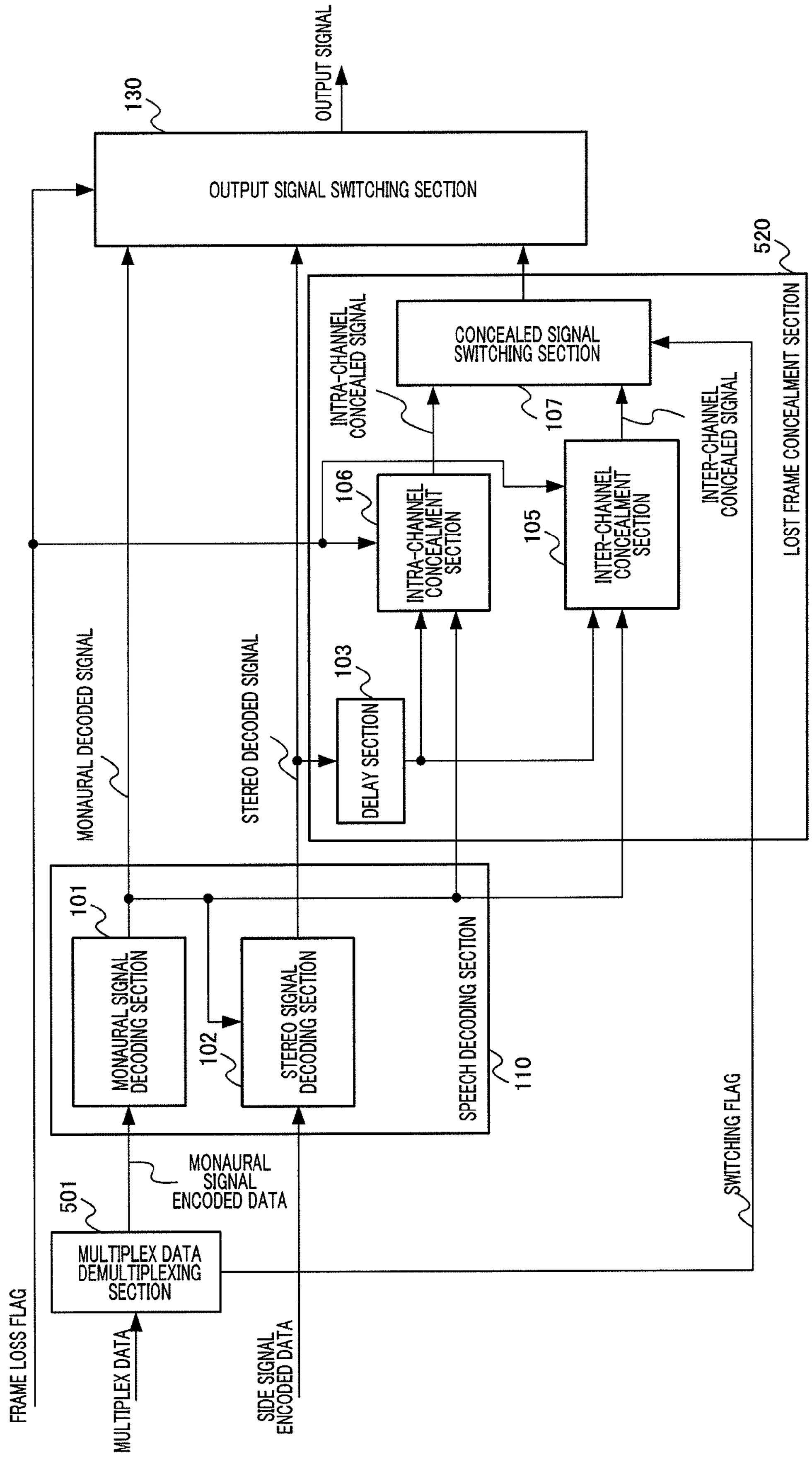
FIG. 11 is a block diagram showing the main components of a speech decoding apparatus according to Embodiment 4 of the present invention.

FIG. 11 is a block diagram showing the main components of speech decoding apparatus 500 according to Embodiment 4 of the present invention. Here, speech decoding apparatus 500 shown in FIG. 11 is basically the same as speech decoding apparatus 100 shown in FIG. 1, and differs from speech decoding apparatus 100 in providing multiplex data demultiplexing section 501 without concealed signal switching deciding section 104 and outputting a switching flag from multiplex data demultiplexing section 501 to concealed signal switching section 107. Also, lost frame concealment section 520 differs from lost frame concealment section 120 in not providing concealed signal switching deciding section 104, and is therefore assigned a different reference numeral.

Multiplex data demultiplexing section 501 demultiplexes multiplex data transmitted from speech encoding apparatus 400 into the monaural signal encoded data and switching flag, outputs the monaural signal encoded data to monaural signal decoding section 101 and outputs the switching flag to concealed signal switching section 107.

Thus, according to the present embodiment, the speech encoding apparatus calculates the inter-channel correlation and intra-channel correlation using stereo signals and monaural signal of the current frame, decides the switching of a concealed signal of the current frame and transmits the decision result to the speech decoding apparatus, so that, based on the inter-channel and intra-channel correlations in that frame in which a frame loss occurs, it is possible to decide a switching accurately and improve the quality of decoded speech.

Also, by multiplexing a decision flag and monaural signal encoded data and transmits the result as monaural signal encoded layer data, the decoding side can receive only the monaural signal encoded layer data, receive information of the switching flag even if stereo signal encoded layer data cannot be received, decide a switching accurately as above and improve the quality of decoded speech.

Also, although an example case has been described above where the speech decoding apparatus according to the present embodiment receives and processes bit streams transmitted from the speech encoding apparatus according to the present embodiment, the present invention is not limited to this, and an essential requirement is that bit streams received and processed by the speech decoding apparatus according to the present embodiment need to be transmitted from a speech encoding apparatus that can generate bit streams which can be processed by that speech decoding apparatus.

Embodiment 5

With Embodiment 5, the encoding side decides the switching of a stereo concealed signal, multiplexes the decision result and side signal encoded data and transmits the result in Embodiment 4 where a decision result is transmitted to the decoding side.

Figure 12:
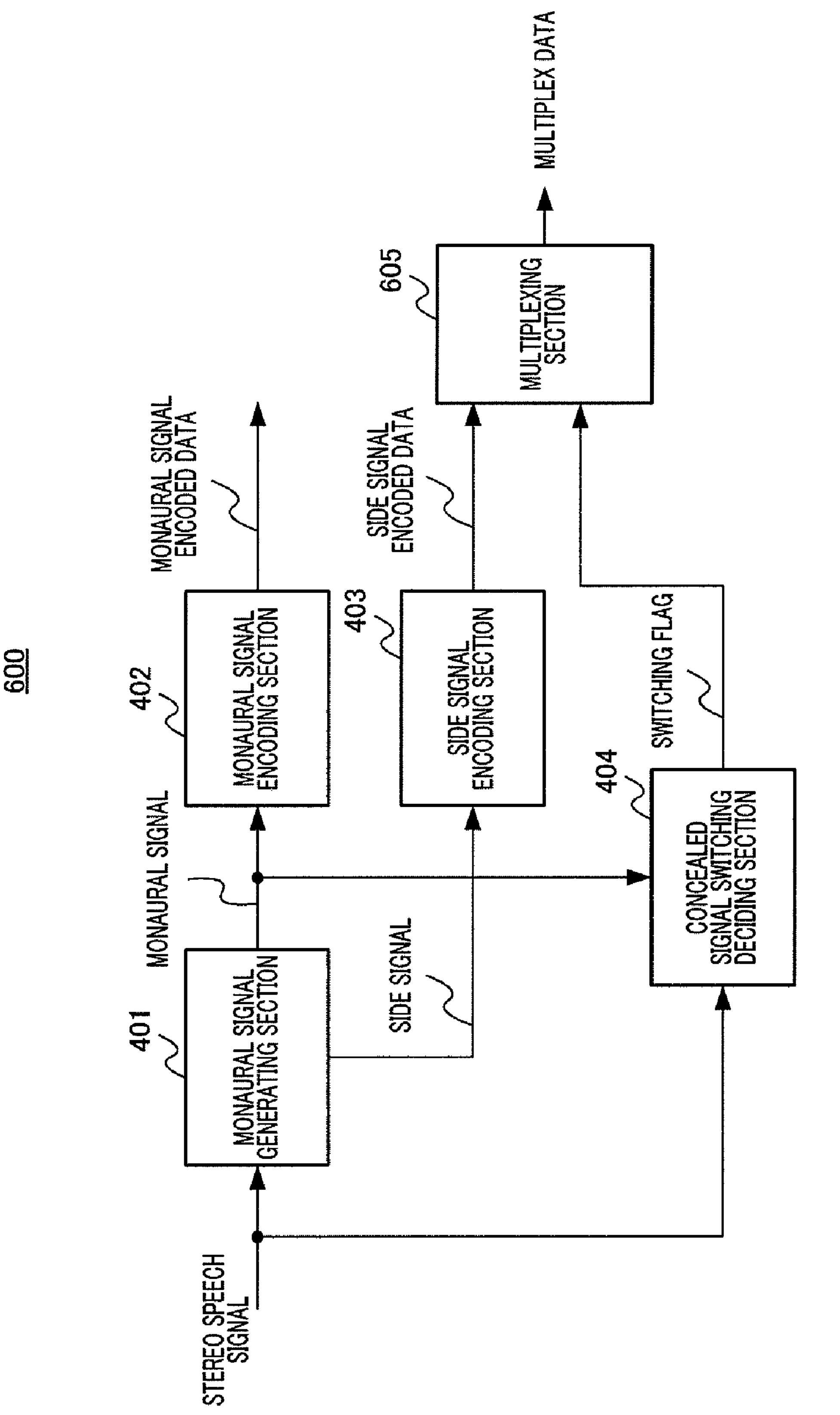
FIG. 12 is a block diagram showing the main components of a speech encoding apparatus according to Embodiment 5 of the present invention.

FIG. 12 is a block diagram showing the main components of speech encoding apparatus 600 according to the present embodiment.

In FIG. 12, speech encoding apparatus 600 is provided with monaural signal generating section 401, monaural signal encoding section 402, side signal encoding section 403, concealed signal switching deciding section 404 and multiplexing section 605.

Speech encoding apparatus 600 according to the present embodiment is basically the same as speech encoding apparatus 400 (see FIG. 10) shown in Embodiment 4, and differs from speech encoding apparatus 400 only in providing multiplexing section 605 instead of multiplexing section 405. Here, in speech encoding apparatus 600 according to the present embodiment in FIG. 12, the same components as in FIG. 10 will be assigned the same reference numerals and their explanation will be omitted.

Multiplexing section 605 multiplexes side signal encoded data received as input from side signal encoding section 403 and switching flag received as input from concealed signal switching deciding section 404, and outputs the resulting multiplex data, as stereo signal encoded layer data, to speech decoding apparatus 700, which will be described later.

Next, in speech encoding apparatus 600 according to the present embodiment, the operations of side signal encoding section 403, concealed signal switching deciding section 404 and multiplexing section 605 will be explained in a case where side signal encoding section 403 encodes a side signal using a transform coding scheme.

Side signal encoding section 403 encodes a side signal of the current frame (the n-th frame in this case) received as input from monaural signal generating section 401, using a transform coding scheme, and outputs generated side signal encoded data to multiplexing section 605.

Concealed signal switching deciding section 404 decides the switching of a concealed signal for the current frame (i.e. the n-th frame) using stereo signals S_ch1($n$) and S_ch2($n$) and monaural signal M(n) of the current frame, and outputs a switching flag indicating the decision result to multiplexing section 605.

Multiplexing section 605 multiplexes the side signal encoded data for the current frame received as input from side signal encoding section 403 and the switching flag for the current frame received as input from concealed signal switching deciding section 404, and outputs the resulting multiplex data to speech decoding apparatus 700, which will be described later.

Figure 13:
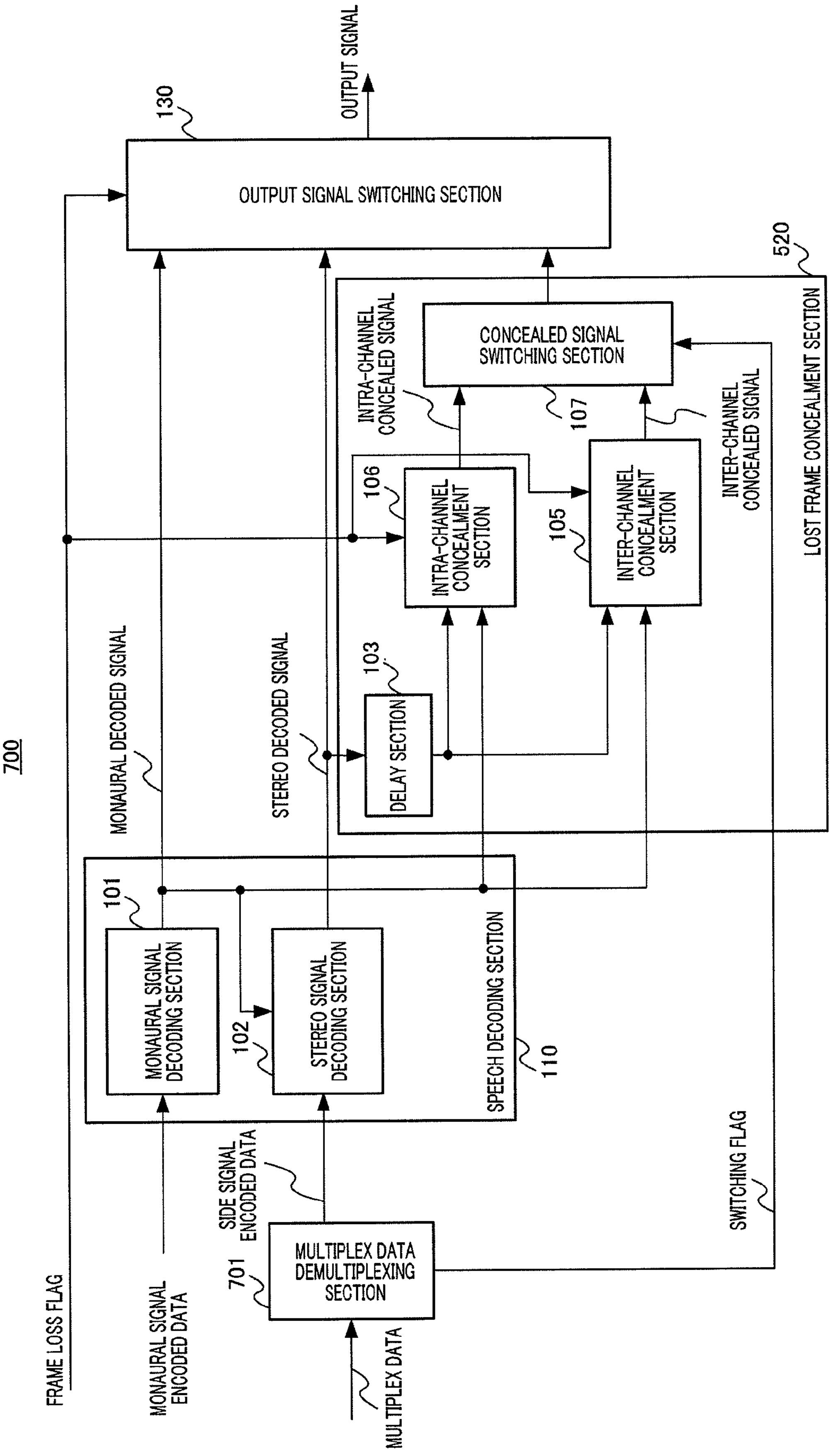
FIG. 13 is a block diagram showing the main components of a speech decoding apparatus according to Embodiment 5 of the present invention.

FIG. 13 is a block diagram showing the main components of speech decoding apparatus 700 according to Embodiment 5 of the present invention. Also, speech decoding apparatus 700 shown in FIG. 13 is basically the same as speech decoding apparatus 500 according to Embodiment 4 shown in FIG. 11, and differs from speech decoding apparatus 500 in demultiplexing multiplex data into the side signal encoded data and switching flag and outputting these.

Next, in speech decoding apparatus 700 according to the present embodiment, the operations will be explained where stereo signal decoding section 102 decodes a stereo signal according to a transform coding scheme.

A stereo decoded signal outputted from stereo signal decoding section 102 is delayed by one frame in delay section 103, for overlap-and-add of transform windows in coding and decoding using the transform coding scheme. If a frame loss flag for the current frame (i.e. the n-th frame) indicates a loss and the frame loss occurs in received data (i.e. side signal encoded data) of the current frame, two frames of the previous frame (i.e. the (n−1)-th frame) and the current frame (i.e. the n-th frame) are influenced, and therefore concealment for two frames is required.

In this case, concealed signal switching section 107 conceals the current frame based on a switching flag for the previous frame separated from multiplex data of the previous frame, and outputs a stereo concealed signal of the previous frame to output signal switching section 130. Also, concealed signal switching section 107 conceals the current frame based on a concealment mode indicated by a switching flag for the next frame (i.e. the (n+1)-th frame) separated from multiplex data of the next frame, and outputs a stereo concealed signal of the current frame to output signal switching section 130. Thus, with reference to switching flags for frames determined in accordance with concealment target frames, concealed signal switching section 107 outputs one of an inter-channel concealed signal acquired in inter-channel concealment section 105 and intra-channel concealed signal acquired in intra-channel concealment section 106, as a stereo concealed signal, to output signal switching section 130.

Thus, according to the present embodiment, in a case where stereo signal decoding section 102 performs decoding according to a transform coding scheme, if a frame loss occurs in received data of the current frame, the speech decoding apparatus conceals the previous frame based on a concealment mode indicated by a switching flag for the precious frame, so that it is possible to perform a concealment based on a more accurate switching decision, depending on the inter-channel and intra-channel correlations in the concealment target frame (i.e. the previous frame) for the frame loss, and improve the quality of decoded speech.

Also, if a frame is lost in the current frame, the speech decoding apparatus according to the present embodiment generates and outputs a stereo concealed signal of the previous frame by concealing the previous frame, and, in the next frame, generates and outputs a stereo concealed signal of the current frame by concealing the current frame (which is the previous frame of the next frame), so that a new additional delay does not occur due to that concealment method.

Also, although an example case has been described above where the speech decoding apparatus according to the present embodiment receives and processes bit streams transmitted from the speech encoding apparatus according to the present embodiment, the present invention is not limited to this, and an essential requirement is that bit streams received and processed by the speech decoding apparatus according to the present embodiment need to be transmitted from a speech encoding apparatus that can generate bit streams which can be processed by that speech decoding apparatus.

Embodiments of the present invention have been described above.

Also, the speech decoding apparatus, speech encoding apparatus and lost frame concealment method according to the present embodiment are not limited to the above embodiments, and can be implemented with various changes. For example, it is possible to combine and implement the above embodiments adequately.

For example, although example cases have been described with the above embodiments where a monaural signal and side signal are generated according to above equations 1 and 2 in the speech encoding apparatus, the present invention is not limited to this, and it is equally possible to calculate the monaural signal and side signal according to other methods.

Also, it is equally possible to apply the lost frame concealment method according to the above embodiments only to a partial band (e.g. a low band equal to or lower than 7 kHz) and apply another lost frame concealment method to the rest of the band (e.g. a high band higher than 7 kHz).

Also, in the above embodiments, it is equally possible to calculate pitch parameters and LPC parameters required for intra-channel concealment processing, from a monaural decoded signal of the current frame (i.e. concealment frame). Also, it is equally possible to calculate an intra-channel correlation using monaural signals of the current frame and previous frame. Thus, by using a monaural decoded signal of a concealment frame instead of a stereo decoded signal of the previous frame, it is possible to acquire parameters for concealment with higher accuracy of estimation.

Also, the threshold and the level used for comparison may be a fixed value or a variable value set adequately with conditions, that is, an essential requirement is that their values are set before comparison is performed.

Also, although example cases have been described with the above embodiments where the encoding side encodes a side signal as stereo signal coding and the decoding side decodes side signal encoded data to generate a stereo decoded signal, the method of encoding a stereo signal is not limited to this. For example, the encoding side may transmit a monaural decoded signal subjected to coding in a monaural signal encoding section and local decoding, and stereo signal encoded data acquired by encoding input stereo signals (i.e. a first channel signal and second channel signal), to the decoding side, and the decoding side may output a first channel decoded signal and second channel decoded signal acquired by performing decoding using the stereo signal encoded data and monaural decoded signal, as a stereo decoded signal. In this case, it is equally possible to perform the same frame concealment in the above embodiments.

Also, the speech decoding apparatus and speech encoding apparatus according to the above embodiments can be mounted on wireless communication apparatuses such as a wireless communication mobile station apparatus and wireless communication base station apparatus in a mobile communication system.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-339852, filed on Dec. 28, 2007, and Japanese Patent Application No. 2008-143936, filed on May 30, 2008, including the specifications, drawings and abstracts, are incorporated herein by reference in their entireties.

INDUSTRIAL APPLICABILITY

The present invention is applicable for use such as communication apparatuses in, for example, a mobile communication system and packet communication system using an Internet protocol.

The invention claimed is:

1. A stereo speech decoding apparatus, comprising:

a monaural decoding section that decodes monaural encoded data to generate a monaural decoded signal, the monaural encoded data encoding in a speech encoding apparatus a monaural signal acquired using an addition of a first channel signal and second channel signal;

a stereo decoding section that decodes side signal encoded data to generate a side decoded signal, and generates a stereo decoded signal comprised of a first channel decoded signal and second channel decoded signal using the monaural decoded signal and the side decoded signal, the side signal encoded data encoding in the speech encoding apparatus a side signal acquired using a difference between the first channel signal and the second channel signal;

a comparison section that compares a comparison threshold with an inter-channel correlation and intra-channel correlation calculated using a monaural decoded signal of a past frame and a stereo decoded signal of the past frame;

an inter-channel concealment section that performs an inter-channel concealment using the monaural decoded signal of a current frame and the stereo decoded signal of the past frame, and generates an inter-channel concealed signal;

an intra-channel concealment section that performs an intra-channel concealment using the monaural decoded signal of the current frame and the stereo decoded signal of the past frame, and generates an intra-channel concealed signal;

a concealed signal selecting section that selects one of the inter-channel concealed signal and the intra-channel concealed signal, as a concealed signal, based on a comparison result in the comparison section; and an output signal switching section that outputs the stereo decoded signal when the side signal encoded data of the current frame is not lost, and outputs the concealed signal when the side signal encoded data of the current frame is lost.

2. The stereo speech decoding apparatus according to claim 1, wherein:

the comparison section comprises:

an inter-channel correlation calculating section that calculates an average value of a cross-correlation between the monaural decoded signal of the past frame and the first channel decoded signal of the past frame and a cross-correlation between the monaural decoded signal of the past frame and the second channel decoded signal of the past frame, as the inter-channel correlation; and an intra-channel correlation calculating section that calculates an average value of an autocorrelation of the first channel decoded signal of the past frame and an autocorrelation of the second channel decoded signal of the past frame, as the intra-channel correlation; and the concealed signal selecting section selects the intra-channel concealed signal in a case where the inter-channel correlation is lower than a first comparison threshold and the intra-channel correlation is higher than a second comparison threshold, or selects the inter-channel concealed signal in other cases.

3. The stereo speech decoding apparatus according to claim 1, wherein the intra-channel concealment section comprises:

an autocorrelation calculating section that calculates autocorrelations of the first channel decoded signal and the second channel decoded signal of the past frame;

a dedicated intra-channel concealment section that generates a dedicated intra-channel concealed signal by performing an intra-channel concealment using a signal of a higher autocorrelation between the first channel decoded signal of the past frame and the second channel decoded signal of the past frame; and an other channel concealed signal calculating section that calculates a concealed signal of the current frame for a signal of a lower autocorrelation between the first channel decoded signal of the past frame and the second channel decoded signal of the past frame, using the monaural decoded signal of the current frame.

4. The stereo speech decoding apparatus according to claim 1, wherein the intra-channel concealment section comprises:

a dedicated intra-channel concealment section that generates a first intra-channel concealed signal and second intra-channel concealed signal by performing an intra-channel concealment using the stereo decoded signal of the past frame;

a monaural concealed signal generating section that generates the monaural signal as a monaural concealed signal, using the first intra-channel concealed signal and the second intra-channel concealed signal;

a similarity calculating section that calculates a similarity between the monaural concealed signal and the monaural decoded signal of the current frame; and a second selecting section that selects a stereo signal comprised of the first intra-channel concealed signal and the second intra-channel concealed signal as the intra-channel concealed signal when the similarity is equal to or higher than a third threshold, or selects a stereo signal acquired by duplicating the monaural decoded signal of the current frame as the intra-channel concealed signal when the similarity is lower than the third threshold.

5. A lost frame concealment method, comprising:

decoding monaural encoded data to generate a monaural decoded signal, the monaural encoded data encoding in a speech encoding apparatus a monaural signal acquired using an addition of a first channel signal and second channel signal;

decoding side signal encoded data to generate a side decoded signal, and generating a stereo decoded signal comprised of a first channel decoded signal and second channel decoded signal using the monaural decoded signal and the side decoded signal, the side signal encoded data encoding in the speech encoding apparatus a side signal acquired using a difference between the first channel signal and the second channel signal;

comparing a comparison threshold with an inter-channel correlation and intra-channel correlation calculated using the monaural decoded signal of a past frame and the stereo decoded signal of the past frame;

performing an inter-channel concealment using a monaural decoded signal of a current frame and a stereo decoded signal of the past frame, and generating an inter-channel concealed signal;

performing an intra-channel concealment using the monaural decoded signal of the current frame and the stereo decoded signal of the past frame, and generating an intra-channel concealed signal;

selecting one of the inter-channel concealed signal and the intra-channel concealed signal, as a concealed signal, based on a comparison result in the comparison step; and outputting the stereo decoded signal when the side signal encoded data of the current frame is not lost, and outputting the concealed signal when the side signal encoded data of the current frame is lost.

* * * * *